United States Patent [19]
Johnson et al.

[11] Patent Number: 6,167,124
[45] Date of Patent: Dec. 26, 2000

[54] BIDDING FOR 800 TELECOMMUNICATIONS TRAFFIC

[75] Inventors: Jack J. Johnson; William F. Coyle, both of Summit, N.J.

[73] Assignee: Summit Telecom Systems, Inc., Summit, N.J.

[21] Appl. No.: 09/047,654

[22] Filed: Mar. 25, 1998

Related U.S. Application Data

[63] Continuation-in-part of application No. 09/022,720, Feb. 12, 1998, which is a continuation-in-part of application No. 09/010,609, Jan. 22, 1998, Pat. No. 6,005,925, and a continuation-in-part of application No. 08/804,542, Feb. 24, 1997, and a continuation-in-part of application No. 09/003,170, Jan. 6, 1998, Pat. No. 5,917,897, said application No. 08/804,542, is a continuation-in-part of application No. 08/553,889, Nov. 6, 1995, Pat. No. 5,606,602.

[60] Provisional application No. 60/068,888, Dec. 24, 1997, and provisional application No. 60/041,673, Mar. 26, 1997.

[51] Int. Cl.[7] .................................................. H04M 15/00
[52] U.S. Cl. .......................... 379/112; 379/114; 379/115; 379/220; 379/221
[58] Field of Search ........................... 379/111–115, 120, 379/127, 133–134, 220–221

[56] References Cited

U.S. PATENT DOCUMENTS

| | | | |
|---|---|---|---|
| 5,606,602 | 2/1997 | Johnson et al. | 379/115 |
| 5,917,897 | 6/1999 | Johnson et al. | 379/114 |
| 5,995,602 | 11/1999 | Johnson et al. | 379/116 |
| 6,005,925 | 12/1999 | Johnson et al. | 379/112 |

*Primary Examiner*—Duc Nguyen
*Attorney, Agent, or Firm*—Allen N. Friedman; McCarter & English, LLP

[57] ABSTRACT

The herein disclosed auction service stimulates competition between service providers to carry 800 Customers' traffic and facilitates the 800 Customer's ability to make economic choices between telecommunication carriers. In this method and system, telecommunication switches route toll-free calls (e.g., calls dialed using an NPA of 800 or 888 in the United States and, typically, paid for by the called party, the 800 Customer) in accordance with economic incentives (e.g., least cost routing) resulting from an auction process between participating telecommunication carriers ("Carriers"), administered by a bidding service provider through operation of a central processor, a computer referred to as a bidding moderator (the "Moderator"). The Moderator provides each Carrier with bid information from other Carriers for at least a portion of all point-to-point routes for which any Carrier has submitted a bid. The Carriers receiving the information will have the opportunity thereafter to submit a lower or higher bid for any point-to-point routes on which they wish, respectively, to stimulate or discourage additional traffic.

22 Claims, 23 Drawing Sheets

BIDDING FOR 800 TELECOMMUNICATIONS TRAFFIC

RELATED APPLICATIONS

This application claims the benefit of the priority of Provisional Application Ser. No. 60/041,673 filed Mar. 26, 1997 and is a Continuation-in-Part of application Ser. No. 09/022,720, filed Feb. 12, 1998. Application Ser. No. 09/022,720 is a Continuation-in-Part of applications Ser. No. 09/010,609, filed Jan. 22, 1998, which issued on Dec. 21, 1999 as U.S. Pat. No. 6,005,925, co-pending application Ser. No. 08/804,542, filed Feb. 24, 1997 and co-pending application Ser. No. 09/003,170 filed Jan. 06, 1998, now U.S. Pat. No. 5,917,897, and depends for priority on Provisional Application Ser. No. 60/068,888 filed Dec. 24, 1997. Application Ser. No. 08/804,542 is a Continuation-in-Part of application Ser. No. 08/553,889, Filed Nov. 06, 1955, now U.S. Pat. No. 5,606,602, issued Dec. 25, 1997.

FEDERALLY SPONSORED RESEARCH

Not Applicable

BACKGROUND OF THE INVENTION

1. Field of the Invention

The invention is in the field of telecommunication network control.

2. Description of the Background Art

Toll-free long distance calling (e.g., using 800 and 888 numbers) has grown over the last 10 years, according to recent press reports, to comprise as much as 25% of all domestic interstate voice traffic. Much of this growth can be attributed to the expanding uses to which toll-free numbers are being put (e.g., for calling cards, nationwide paging, telemarketing campaigns, customer service centers, etc.). The called party, instead of the caller, typically pays the tolls associated with such calls to the telecommunication carrier whose network carried the call.

A party wishing to offer toll-free calling to callers today must sign up for toll-free service (typically, using 800 or 888 prefixes) with an established interexchange carrier. This carrier is designated as the called party's presubscribed interexchange carrier for all calls made to the designated toll-free number. Regulatory authorities now permit the called party offering toll-free calling (the "800 Customer") to change its carrier without changing its toll-free number.

When a caller in the United States, for example, dials 800-NXX-XXXX or 888-NXX-XXX, the local exchange carrier's central office switch associated with that caller recognizes that the number dialed is a toll-free number. The switch sends a query to a remote centrally-administered database (e.g., the 800 Database) to determine which interexchange carrier is the designated carrier for calls to this toll-free number. The 800 Database responds to the switch by providing a carrier identifier for the designated interexchange carrier (e.g., the carrier with whom the 800 Customer has an account relationship). The switch then routes the call to that carrier for completion. The interexchange carrier translates the dialed toll-free number into the specific NPA-NXX-XXXX destination associated with that toll-free number in a database maintained by the carrier. The carrier then completes the call to the destination specified. All calls to this toll-free number will be carried by this designated carrier unless and until the 800 Customer decides to change carriers. In that event the newly selected interexchange carrier will notify the administrator or other party maintaining the 800 Database and the 800 Database will be updated to reflect this change.

Large 800 Customers (e.g., airline reservation centers, inbound telemarketing companies, etc.) generally install dedicated access facilities to and from one or more interexchange carriers' points-of-presence, primarily to avoid the access charges levied by the local exchange carrier if calls are received via the public switched telephone network. Inbound toll-free calls are routed in that case from the interexchange carrier's point-of-presence directly to the 800 Customer's premises, without passing through the local exchange carrier's local switching network. If, however, the dedicated access facility has a "trouble" or is otherwise not available, the interexchange carrier will normally route all calls from its point-of-presence to the local exchange carrier's local switched network for completion to the 800 Customer's premises (in that case, of course, the 800 Customer will likely pay the local exchange carrier's access charges for all such calls).

Typically, 800 Customers pay the interexchange carrier for each completed call, based most often on the duration of the call. Carriers usually offer better pricing to those 800 Customers who sign fixed-price contracts with significant volume commitments and terms of at least 12 months.

Many locally managed telecommunication switching systems, such as PBXs, employ "least cost routing" software to reduce telecommunication costs. The system's manager arranges with more than one interexchange carrier to carry the system's traffic. The manager keeps track of each carrier's charges and populates the routing table in the "least cost routing" software. The charges may be the regularly tariffed charges of the subscriber's primary carrier or contracted charges offered by an alternate carrier for a bulk discount or for discounting traffic during a specific time period during the day. The "least cost routing" software will examine each call attempt and automatically decide which carrier is the best economic choice for that call.

In the last few years a great deal of competition has developed among telecommunication carriers to win new 800 Customers. As telecommunication service becomes more of a commodity, increased competition would be of great benefit to 800 Customers, large and small.

SUMMARY OF THE INVENTION

The herein disclosed invention stimulates competition between service providers to carry 800 Customers' traffic and facilitates the customer's ability to make economic choices between telecommunication carriers.

In this method and system, telecommunication switches route toll-free calls (e.g., calls dialed using an NPA of 800 or 888 in the United States and, typically, paid for by the called party, the 800 Customer) in accordance with economic incentives (e.g., least cost routing) resulting from an auction process between participating telecommunication carriers ("Carriers"), administered by a bidding service provider through operation of a central processor, a computer referred to as a bidding moderator (the "Moderator").

In this arrangement, each of the Carriers transmits to the Moderator the rate it is willing to charge (or other economic incentive it is willing to offer) for service between two specific switching points on one or more telecommunication networks, from an originating switching point to a toll-free call's specific terminating switching point (otherwise referred to herein as a "route"), at some particular time. A "route" is service from the "originating switching point," i.e., the switching point on a telecommunications network that serves as the most immediate switching interface between the calling party and that telecommunications network (e.g., a local exchange switch or equivalent local switching node, whether hardware or software-defined, providing access to that network), to the "terminating switching point," i.e., the switching point on a telecommunications network (which may, but need not be, owned or operated by the same carrier who owns or operates the originating switching point) that serves as the most immediate switching interface between the called party and that telecommunications network (e.g., a local exchange switch or equivalent local switching node, whether hardware or software-defined, providing access to that network).

Carriers may submit bids to the Moderator for routes over different types of telecommunications networks (e.g., circuit-switched, frame relay, asynchronous transfer mode, packet data networks such as the Internet, etc.) and for different classes of telecommunications service provided by such networks (e.g., transmission of voice, data, video, etc.). Access to such telecommunications networks or facilities by end users or by other telecommunications carriers or service providers may be, for example, via the public switched telephone network, dedicated facilities, private lines, wireless facilities, coaxial cable, electric utility power lines, Ethernet or other local area network (LAN), metropolitan area network (MAN) or wide area network (WAN) connections.

The bid rate may be lower than the bidding Carrier's established rate for any of several reasons (e.g., the Carrier has excess capacity on a particular route at the time). The Carrier may, for example, also decide for capacity or competitive reasons to place the same bid (i) on all toll-free traffic having the same originating switching point (e.g., an NPA-NXX) independent of terminating switching point, (ii) on all toll-free traffic having the same terminating switching point (e.g., an NPA-NXX) independent of originating switching point, or (iii) on all toll-free traffic independent of originating and terminating switching points. The Carrier may change its bids as often as it likes during the day as traffic patterns change. The Moderator collects this bid information from all the Carriers, sorts it among originating and terminating switching points and may further process this information, for example, to select Carriers for particular routes or for individual calls. This carrier selection information may include, for example, a prioritization of the Carrier selection in accordance with Carriers' bids for each route or the designation of a selected Carrier and, perhaps, a default Carrier.

After each new bid is submitted by a Carrier and processed by the Moderator, the Moderator will distribute at least a portion of the bid information to participating Carriers' network management centers. The Moderator provides each Carrier with bid information from other Carriers for at least a portion of all point-to-point routes for which any Carrier has submitted a bid (e.g., from any originating NPA-NXX to any other NPA-NXX, or otherwise-defined destination, on the public switched telecommunications network in the world). The Carriers receiving the information will have the opportunity thereafter to submit a lower or higher bid for any point-to-point routes on which they wish, respectively, to stimulate or discourage additional traffic. A Carrier may wish to submit different bids for routes that terminate using more than one class of service (e.g., call completion via the local exchange carrier's local switched network for some toll-free calls, call completion via dedicated access facilities for others).

After processing the bids from each Carrier, the Moderator provides carrier selection information to the 800 Database. This is the same 800 Database queried today (as part of the existing public switched telecommunications network architecture) by the local exchange carrier's central office switch whenever that switch is presented with a call to a toll-free number. The Moderator, or an adjunct computer associated with the 800 Database (and to which the Moderator has a data link), enters a Carrier designation in the 800 Database for each toll-free number subject to the auction process (i.e., those 800/888 numbers assigned to participating 800 Customers). Each toll-free number's Carrier designation in the 800 Database will be updated periodically to reflect the results of the auction process. When the 800 Database is next queried by a central office switch that has been presented with a call to such a toll-free number, the 800 Database will respond to the central office switch by providing the Carrier identifier for the Carrier designated by the Moderator (or adjunct computer) for calls to that toll-free number at that time. The central office switch will then route that call to the interexchange Carrier so designated. The 800 Database may permit the Moderator to designate more than one Carrier for calls to be made to the same toll-free number in order to enable Carriers to bid on calls to that toll-free number from different originating switching points (e.g., from different NPA-NNXs). The appropriate designated Carrier for each call would be identified, for example, on the basis of the NPA-NXX of the central office switch making the query to the 800 Database or, perhaps, the 10-digit telephone number or ANI of the calling party.

The query by the local exchange carrier's central office switch to the 800 Database to determine to which Carrier the switch should route a toll-free call may also be implemented as follows. When the central office switch is presented with a call to a toll-free number and sends a query to the 800 Database, the 800 Database will, in turn, send a query to the Moderator (or an adjunct computer associated with the Moderator or 800 Database, and to which the Moderator has a data link) asking for the designated Carrier to which calls to this toll-free number should be routed at that time. The Moderator (or adjunct computer) responds to this query from the 800 Database by transmitting the applicable carrier selection data, and the 800 Database then responds to the earlier query from the central office switch by providing the designated Carrier identifier. The central office switch then routes that call to the Carrier so identified. As described above, the 800 Database may designate more than one Carrier for calls to be made to the same toll-free number in order, for example, to enable Carriers to bid on calls to that toll-free number from different NPA-NXX originating switching points. The appropriate designated Carrier for each call would be identified, for example, on the basis of the NPA-NXX of the central office switch making the query to the 800 Database or, perhaps, the 10-digit telephone number or ANI of the calling party.

Alternative implementations are available to the bidding service provider if the 800 Database administrator elects, for any reason, not to accommodate recurring changes (e.g., daily, hourly, or continuous) in the interexchange Carrier designation in the 800 Database for each toll-free number. In one alternative implementation, the Moderator would not designate the selected Carrier in the 800 Database (or at least not for calls to a toll-free number which originate from certain originating switching points—e.g., certain NPA-NXXs). Calls made to toll-free numbers of 800 Customers participating in the auction process would, like any other call to a toll-free number, trigger a query to the 800 Database by the central office switch associated with the calling party. If no interexchange carrier is designated in the 800 Database for that toll-free number, the "no-record" response (or its equivalent) by the 800 Database to the central office switch will trigger a second query by the central office switch, but in this case the query will be sent to the Moderator or to an adjunct computer associated with the central office switch (this could include a peripheral computer associated with numerous switches), particularly in the mode in which the Moderator periodically transmits bid information and/or carrier selection data to the adjunct computer. In response to such a query, the Moderator or such adjunct computer (whichever is sent the query by the central office switch) can transmit bid information and/or carrier selection information to this central office switch. The central office switch can then route the toll-free call to the appropriate selected Carrier. Each participating central office switch (or an associated adjunct computer) gets the bid information and/or carrier selection information from the Moderator for all "point-to-point" routes originating in the local exchange areas associated with that switch. From the list of all Carriers providing bid information to the Moderator, the Moderator or each central office switch (or an associated adjunct computer) can select those Carriers to which it wants traffic routed and can change that selection at any time.

In a second alternative implementation available to the bidding service provider (if the 800 Database administrator elects not to accommodate recurring changes in interexchange carrier designations), the bidding service provider may elect to implement the routing of toll-free calls to selected Carriers by designating a particular carrier in the 800 Database. This carrier designation in the 800 Database would seldom, if ever, be changed. Calls made to participating 800 Customers' toll-free numbers would be identified in the 800 Database as toll-free numbers assigned to this carrier. The 800 Database, in response to a query from a central office switch presented with a call to such a toll-free number, would provide the Carrier identifier for this carrier. The central office switch would then route this call to this carrier's local point-of-presence (i.e., in the same manner it routes any other toll-free call to the respective point-of-presence of the interexchange carrier identified by the 800 Database). Under this implementation, the central office switch would route the call to a switch being used primarily to handle toll-free calls (the "800 Switch"). The 800 Switch (or an associated adjunct computer) can query the Moderator for, or periodically receive from the Moderator, bid information and/or carrier selection information relating to the bidding interexchange Carriers and route each toll-free call to the appropriate selected Carrier. The Moderator would transmit selected portions of bid information and/or carrier selection information to each appropriate 800 Switch (or an associated adjunct computer). Each 800 Switch (or an associated adjunct computer) gets the bid information and/or carrier selection information from the Moderator for all "point-to-point routes" originating in one or more local exchange areas associated with that 800 Switch. From the list of all Carriers providing bid information to the Moderator, the Moderator or each 800 Switch (or an associated adjunct computer) can select those Carriers to which it wants traffic routed and can change that selection at any time.

In each of the above implementations of routing calls to selected Carriers according to an auction process, the selected Carrier will perform the translation of the dialed toll-free number to the specific destination of such call (e.g., NPA-XXX-XXXX under the North American Numbering Plan) and then route the call to that destination. The Moderator can transmit the NPA-NXX-XXXX associated with each toll-free number (for 800 Customers participating in the auction process) to each participating Carrier's toll-free number translation database ("800 translation database") to enable each Carrier to execute a translation if a call to a toll-free number is routed to its network by a local exchange carrier's central office switch or by an 800 Switch. As an alternative, the Moderator (or an adjunct computer) could provide the 800 Database with the NPA-NXX-XXXX translation for each such toll-free number and the 800 Database could provide this translation to the central office switch when the 800 Database responds to the switch's query whenever the switch is presented with a toll-free call. If a central office switch queries the Moderator directly, the Moderator (or an adjunct computer) could provide the central office switch (instead of the 800 Database) with the NPA-NXX-XXXX translation for each such toll-free number and the central office switch could execute a translation whenever this central office switch is presented with a toll-free call. If an 800 Switch is routing toll-free calls to selected Carriers, the Moderator (or an adjunct computer) could provide the 800 Switch (instead of the 800 Database) with the NPA-NXX-XXXX translation for each such toll-free number and the 800 Switch could execute a translation whenever the 800 Switch is presented with a toll-free call.

To provide a meaningful opportunity for large 800 Customers to benefit from the auction process, the herein disclosed invention provides an architecture for such customers to receive calls to a toll-free number over dedicated access facilities from several interexchange Carriers. Most large 800 Customers today receive almost all of their incoming calls to a toll-free number over dedicated access facilities from only one interexchange Carrier. In this new architecture each call will be routed, as described previously, to an interexchange Carrier selected as part of the auction process at the originating end of the call. Upon reaching the selected Carrier's point-of-presence serving the destination NPA-NXX, the call will be routed over dedicated facilities to a switch (the "Terminating Auction Switch") which, in turn, will route the call to the 800 Customer's premises over a dedicated access facility. The facilities from each Carrier's destination point-of-presence to the Terminating Auction Switch would probably also be shared facilities (e.g., carrying traffic intended for completion to more than one 800 Customer's premises), enabling each Carrier to keep its costs low and thereby offer more efficient pricing to 800 Customers as part of the auction process. The participating Carriers will each need telecommunication facilities from their respective points-of-presence to the Terminating Auction Switch serving the local area in which the 800 Customer's premises are situated if these Carriers intend to bid for the toll-free traffic of this type of 800 Customer. In the event the Terminating Auction Switch or telecommunication facilities from the Carrier's destination point-of-presence to the Terminating Auction Switch (or from the Terminating Auction Switch to the 800 Customer's premises) have a "trouble" or are not otherwise available, this architecture will also enable each Carrier to route calls from its point-of-presence to the local exchange carrier's local switched network for completion to the 800 Customer's premises. The Terminating Auction Switch would also be able to route calls to the local exchange carrier's local switched network if the dedicated access facility from the Terminating Auction Switch to the 800 Customer's premises equipment has a "trouble" or is not otherwise available.

Through this bidding process, Carriers can compete for toll-free traffic on selected routes or compete for traffic originating from or terminating at selected points in the telecommunication network. Carriers can also manage their network traffic by adjusting their bids from time to time, depending on network traffic information or other network information. And 800 Customers as well as other telecommunication service providers (who may, for example, wish to use the auction process to obtain a lower rate for resale to customers) can easily make economic choices.

Further details of the operation of a telecommunication auction are set forth in U.S. Pat. No. 5,606,602, the disclosure of which is incorporated herein.

DETAILED DESCRIPTION OF THE INVENTION

Figure 1:
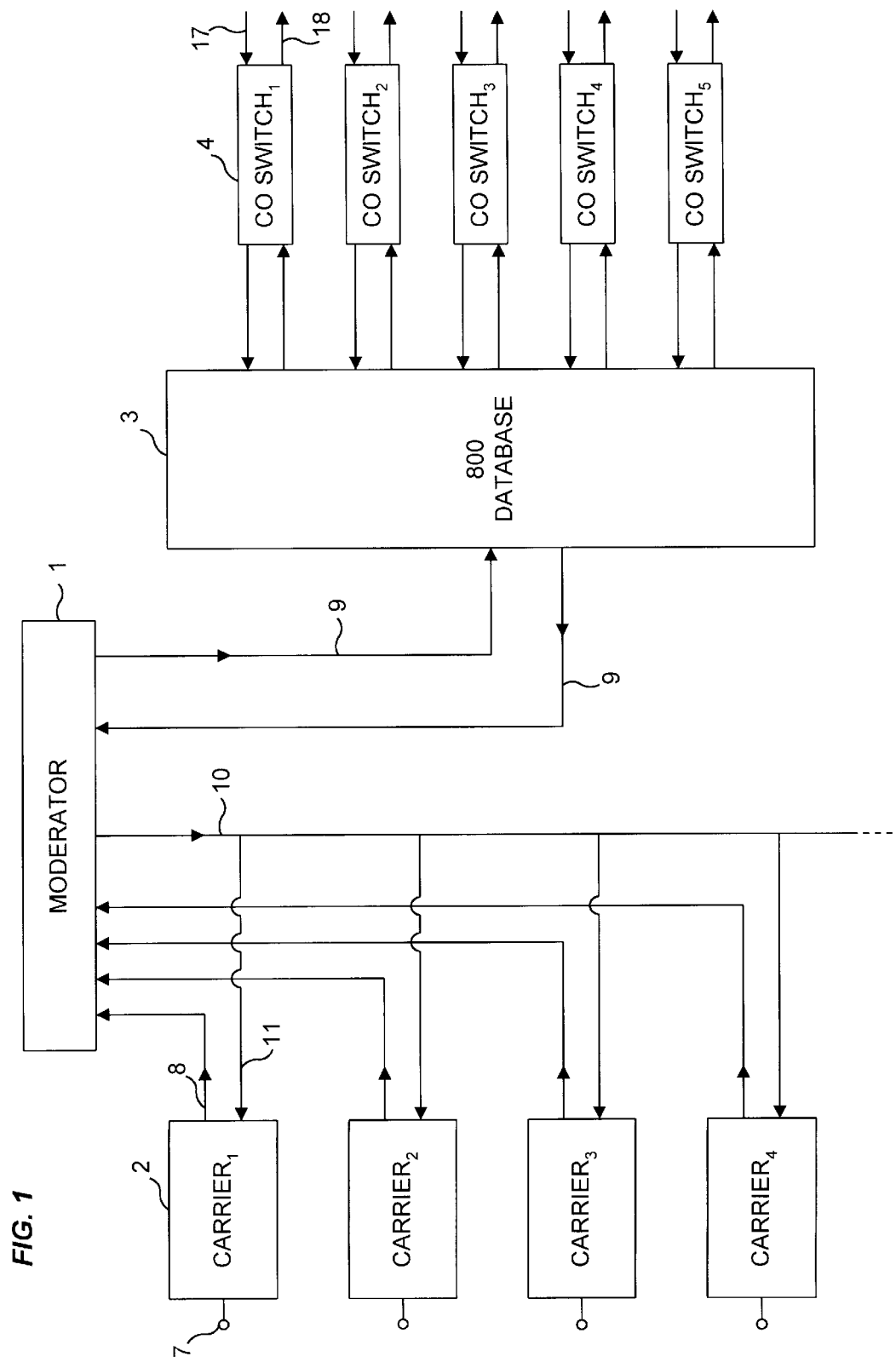
FIG. 1 is a schematic view of an exemplary system of the invention showing dedicated communications lines from each Carrier to the Moderator, from the Moderator to the 800 Database and from the 800 Database to each of the subscribing switches, and a common data link from the Moderator to each of the Carriers.

FIG. 1 shows an exemplary system for carrying out the herein disclosed auction process for telecommunication services, in which a Moderator 1 administers collection of bidding information and dissemination of bidding information and/or carrier selection data. The Moderator 1 includes a computer with a processor and memory, together with input and output devices to communicate with the Carriers' network management computers 2, which are the source of the bidding information, and the 800 Database 3 and the switches 4, which are the ultimate users of data derived from the bidding information.

Figure 11:
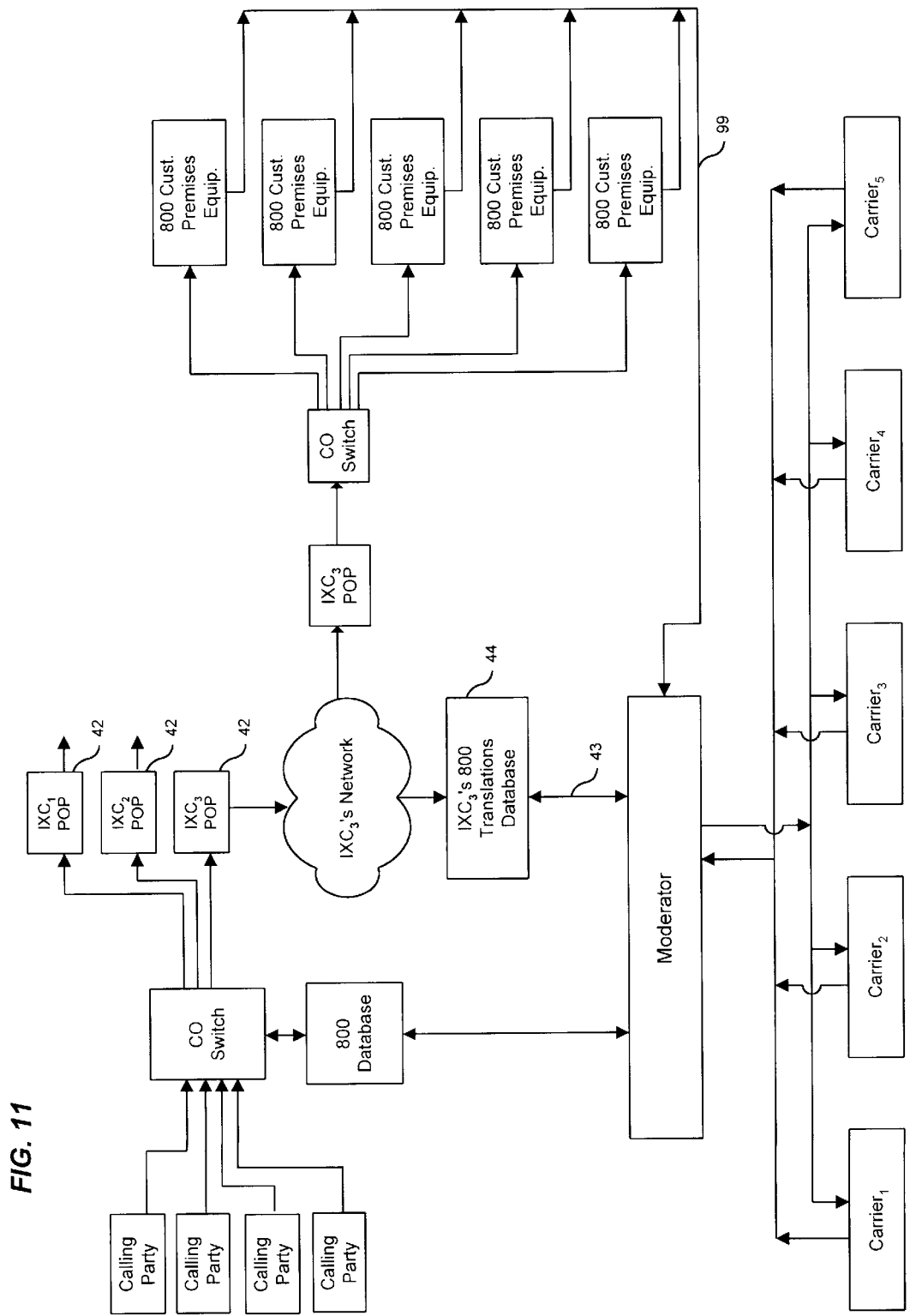
FIG. 11 is a schematic view of an exemplary network architecture showing transmission of carrier selection data from the Moderator to the 800 Database, whether such transmission is initiated by the Moderator or furnished by the Moderator in response to a query from the 800 Database.
Figure 12:
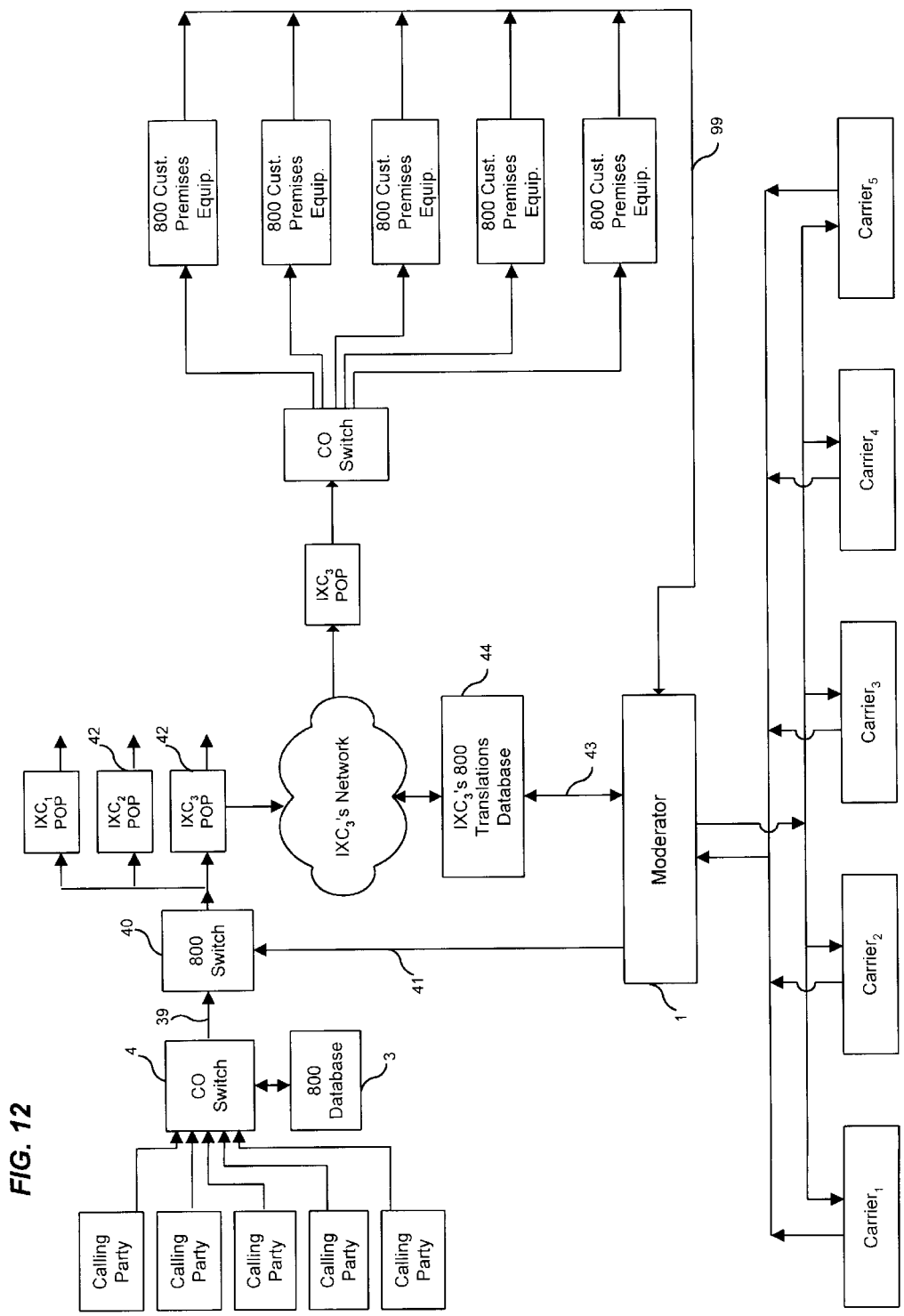
FIG. 12 is a schematic view of an exemplary network architecture showing transmission of bid information and/or carrier selection data from the Moderator to an 800 Switch, whether such transmission is initiated by the Moderator or furnished by the Moderator in response to a query from the 800 Switch.
Figure 13:
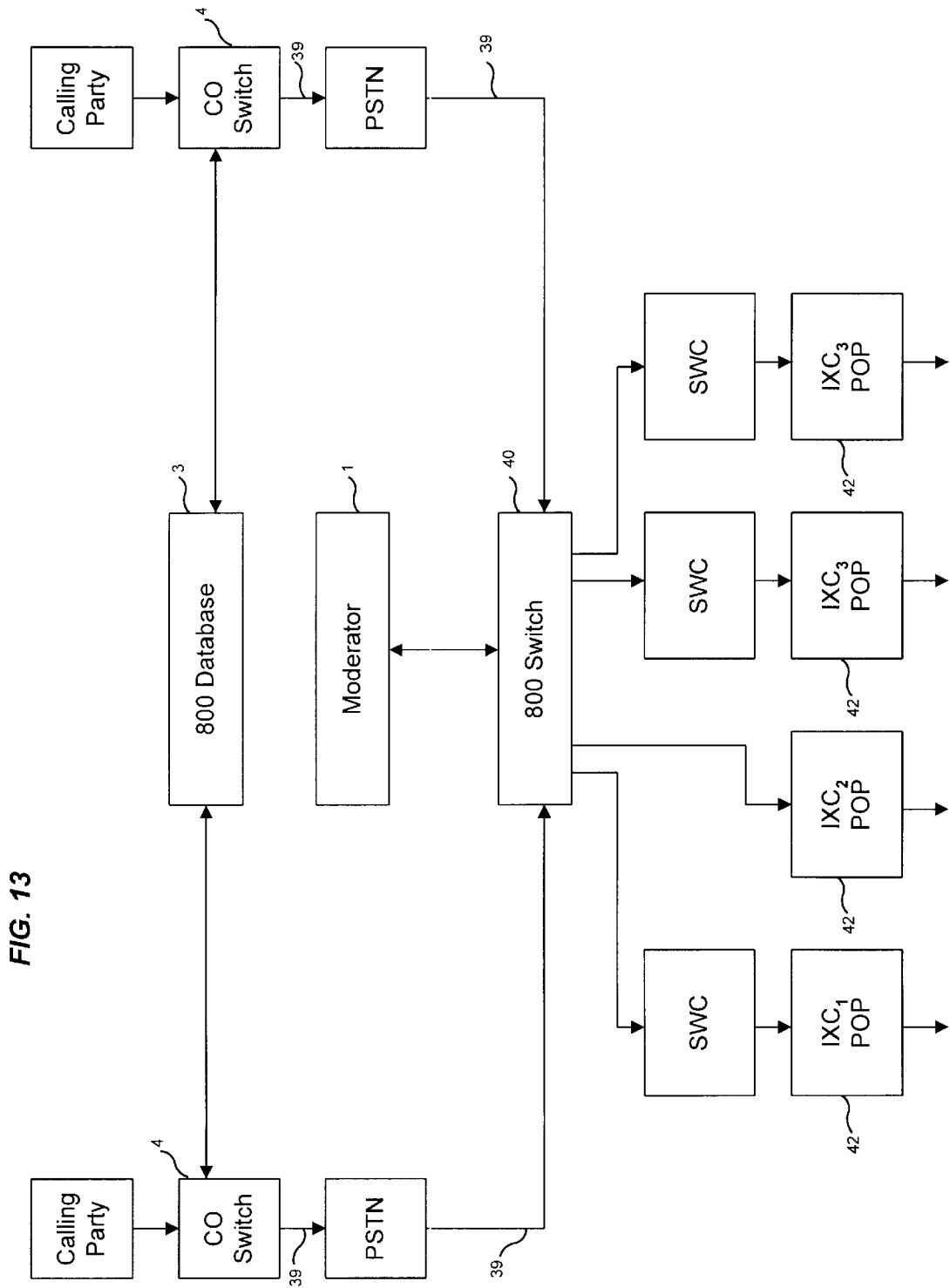
FIG. 13 is a schematic view of an exemplary network architecture in which the Moderator transmits data directly to a dedicated facility switch.

The Carriers are, primarily, Carriers that carry telecommunication traffic between switching points (e.g., originating and terminating switching points such as local exchange switches or equivalent local switching points on telecommunication networks). By means of the FIG. 1 system, for example, the Carriers bid for toll-free traffic from switches 4, associated with a switching point on a telecommunications network, to other switching points on the same or different telecommunications networks. This switch 4 may be a local exchange switch (e.g., a local exchange carrier's central office switch), as illustrated in FIG. 11, or a switch 40 (see FIG. 12) primarily used to handle toll-free calls to 800 Customers ("800 Switch") that have been presented to the local exchange switch, routed to the 800 Switch 40 for processing, and then routed by the 800 Switch 40 to the appropriate interexchange Carrier's point-of-presence 42, as illustrated in FIGS. 12 and 13. Some circumstances may result in the auction process controlling carriage of a call over a route within a single local exchange area. A local exchange area is, typically, the geographic region served by a local exchange switch (or equivalent local switching node).

In FIG. 1, the Carriers transmit their bids from their network management computers 2 over data links 8, which may be either analog (using modems) or digital. However, the information is usually transmitted in digital form for input into the Moderator 1. Each Carrier has a network administrator who enters network management instructions into each network management computer 2 through input port 7 by means, for example, of a keyboard or data link from a remote site or local computer.

Figure 2:
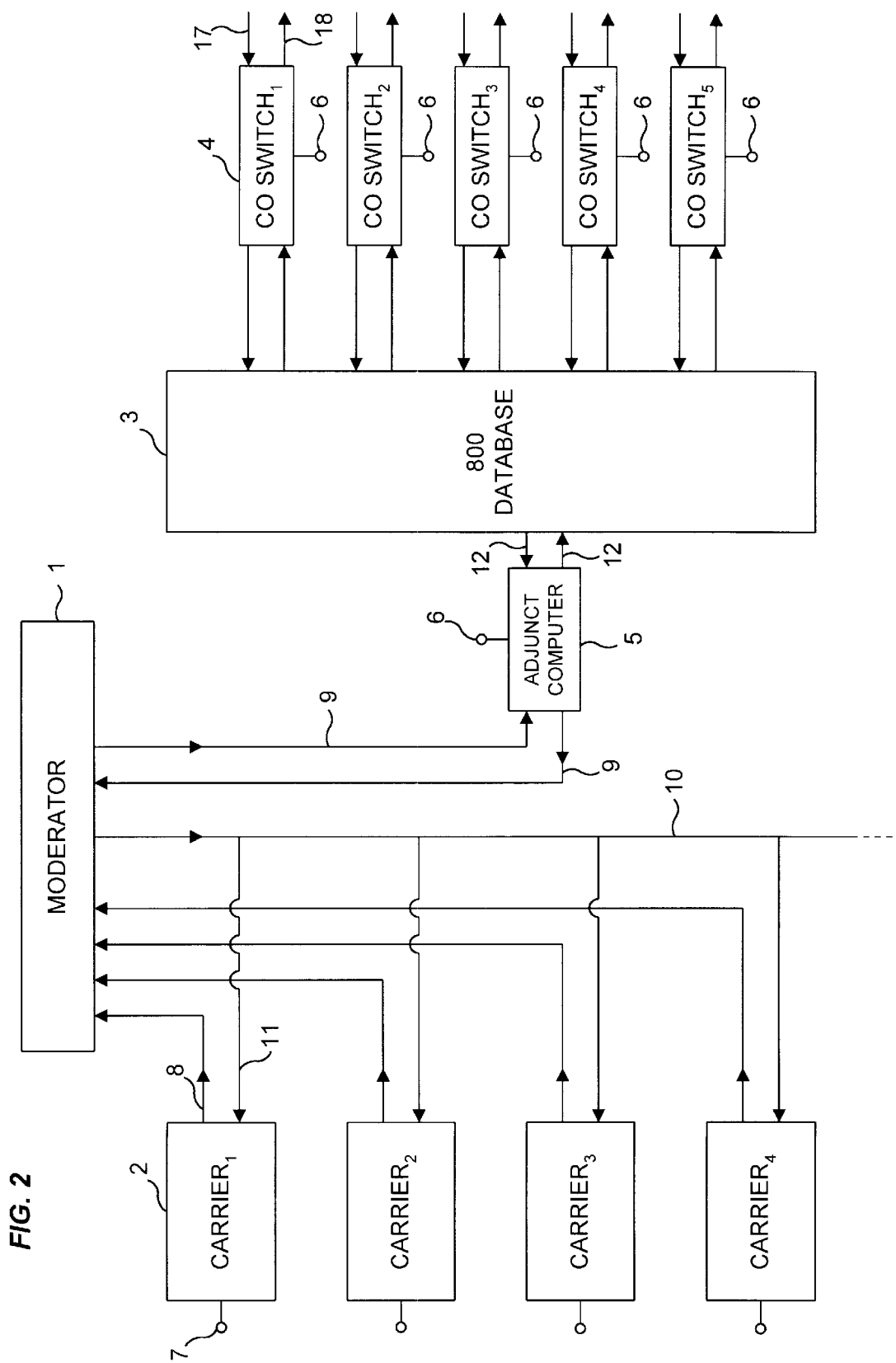
FIG. 2 is a schematic view of an exemplary system of the invention showing dedicated communication links between the Moderator and an adjunct computer, and between this adjunct computer and the 800 Database.

The Moderator 1 receives the bids, processes them in its processor, sorts them, for example, by originating switching point or to produce carrier selection data, and enters both into a database in its memory by means of the data buses and registers internal to a computer. The carrier selection data, applicable to each local exchange switch 4, are transmitted to the 800 Database 3, perhaps as illustrated in FIG. 2 by way of a computer 5 adjunct to the 800 Database 3 over a data link 9. The data link 9 is illustrated as a dedicated transmission facility between the Moderator 1 and the 800 Database 3. However, any other transmission technology offering a selective way to transmit data from the Moderator 1 to the 800 Database may be used. (A "transmission facility" is a telecommunication path or channel. It may be, for example, a wired link, a radio channel in a wireless system, or a time slot in a digitally multiplexed optical transmission system). The data inputs and outputs of the Moderator 1, the network management computers 2, the adjunct computer 5, the 800 Database 3, and the switches 4 are implemented by such devices as interfaces, registers and modems that are well known in the art.

Figure 7:
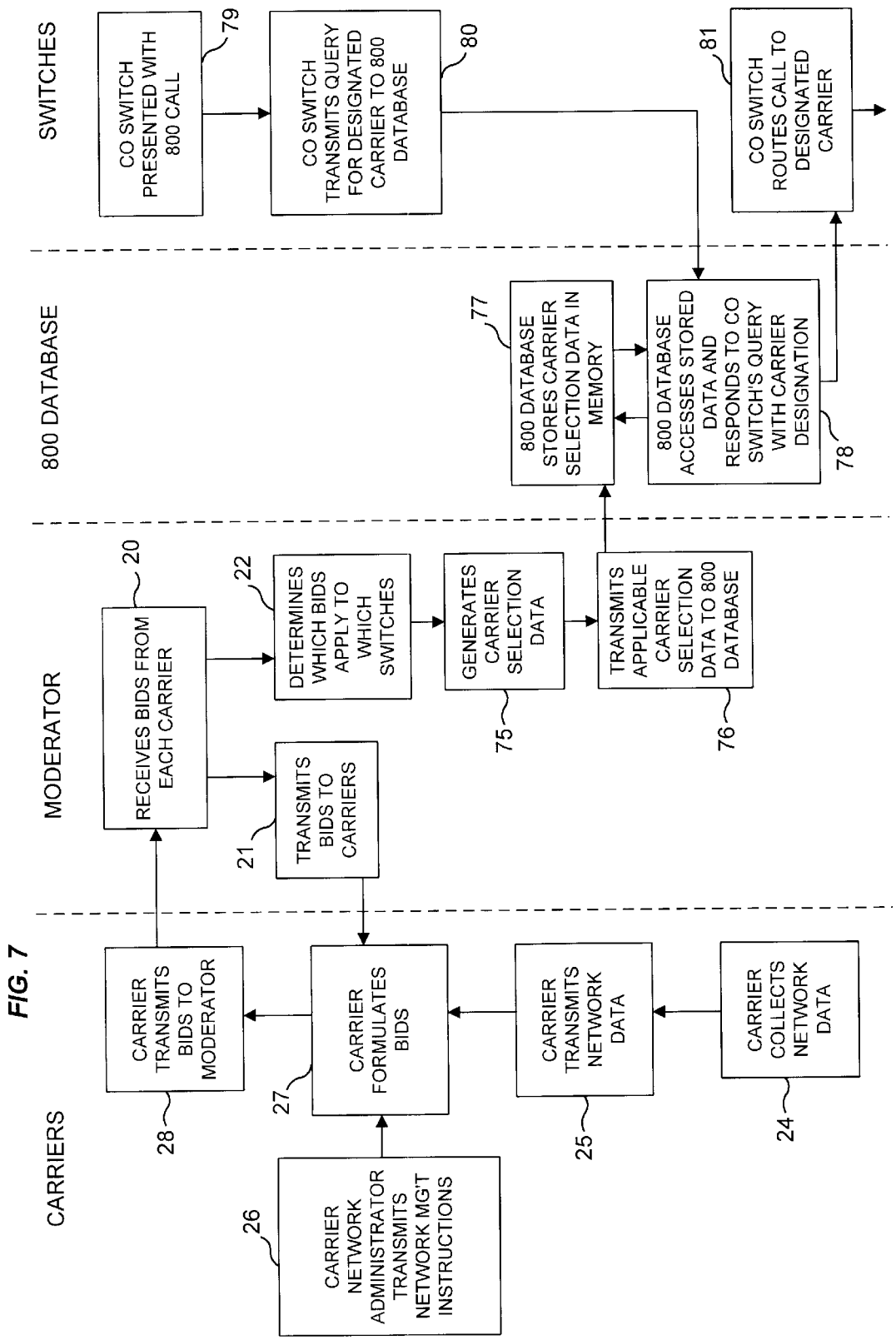
FIG. 7 is a schematic representation of an exemplary process of the invention in which the Moderator generates carrier selection data and transmits such data to the 800 Database in order to change the Carrier designations for each toll-free number.
Figure 8:
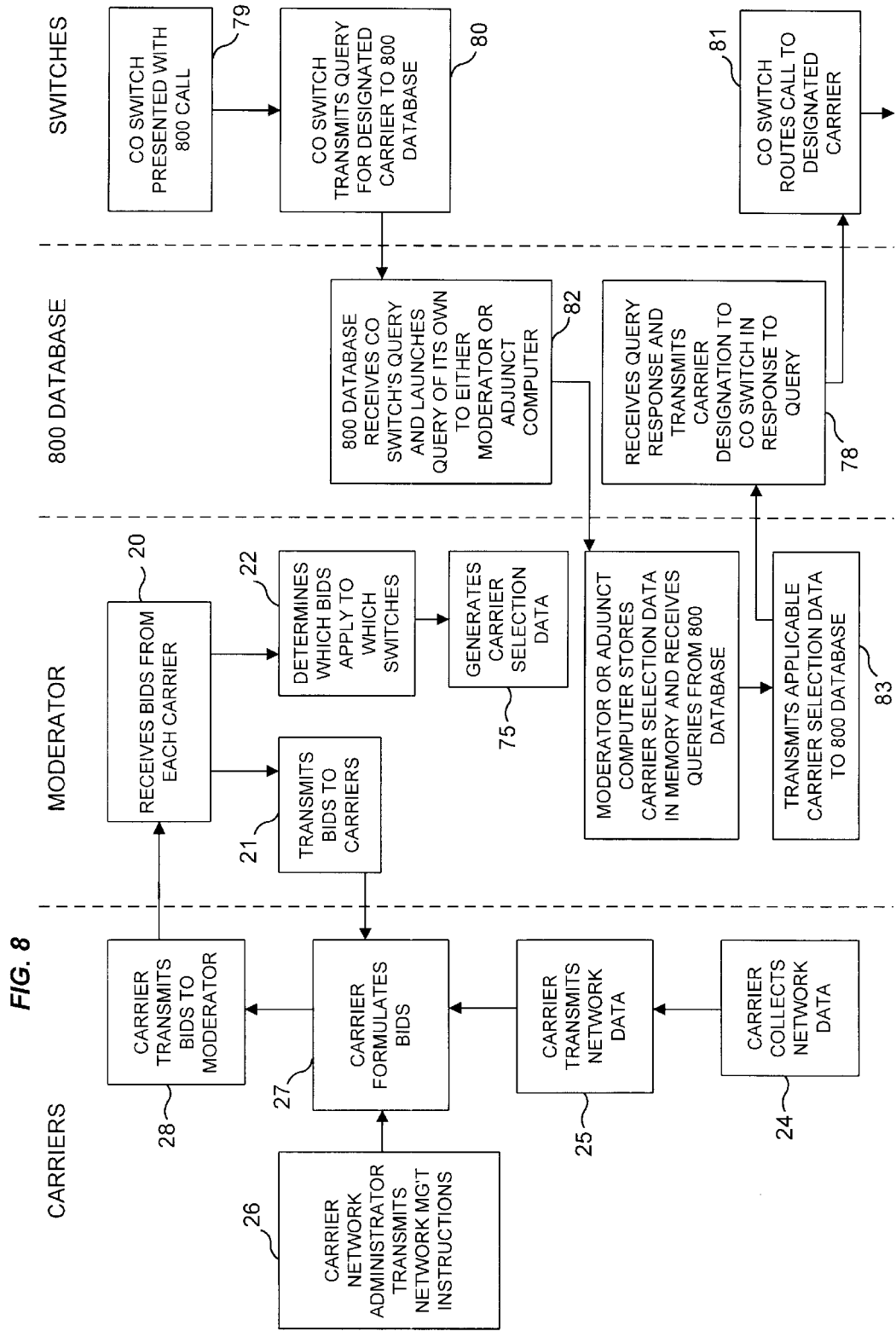
FIG. 8 is a schematic representation of an exemplary process in which the Moderator generates carrier selection data and transmits such data to the 800 Database in response to queries from the 800 Database.

As illustrated in FIGS. 7 and 8, the Moderator 1 processes the bids to prioritize them for each route, producing derivative data, including carrier selection data 22, 75. This data can reflect, for example, designation of a selected Carrier and alternate Carriers, based on the Carriers' bids for each route. The Moderator 1 or the switch 4 can also designate a default Carrier in the event a call cannot be completed via a Carrier selected by the auction process. The Moderator can also, pursuant to decision rules provided by an 800 Customer or the service entity administering the Moderator, override the selection (based on the bidding process) of a Carrier (e.g., in the event an 800 Customer wishes to have all of its toll-free calls carried by a particular Carrier during certain periods of the day). The switch 4 (or an associated adjunct computer) can also be equipped to override the Moderator's selection in accordance with decision rules from the switch administrator through input port 6.

In FIG. 1 the Moderator 1 also transmits received bids to the network management computers 2 of Carriers over the data link 10, 11. The exemplary architecture of FIG. 1 shows a combination of a single output data link 10 and individual Carrier input links 11 for this Moderator-to-Carriers bid data, indicating that the Moderator 1 may send the same data to all Carriers. There are many alternate transmission technologies available to transmit this bid data to all Carriers, including dedicated bi-directional links between the Moderator 1 and each Carrier, combining the function of links 8, 10, and 11.

Depending on the particular implementation, it may be appropriate to transmit all received bids to all Carriers. However, for example, each Carrier's bids need not be transmitted back to the bidding Carrier and there may be Carriers with limited service areas that are not interested in receiving bids from out-of-area Carriers. In any event, at least a portion of the bids are transmitted to at least a portion of the Carriers in order to implement an auction.

Figure 3:
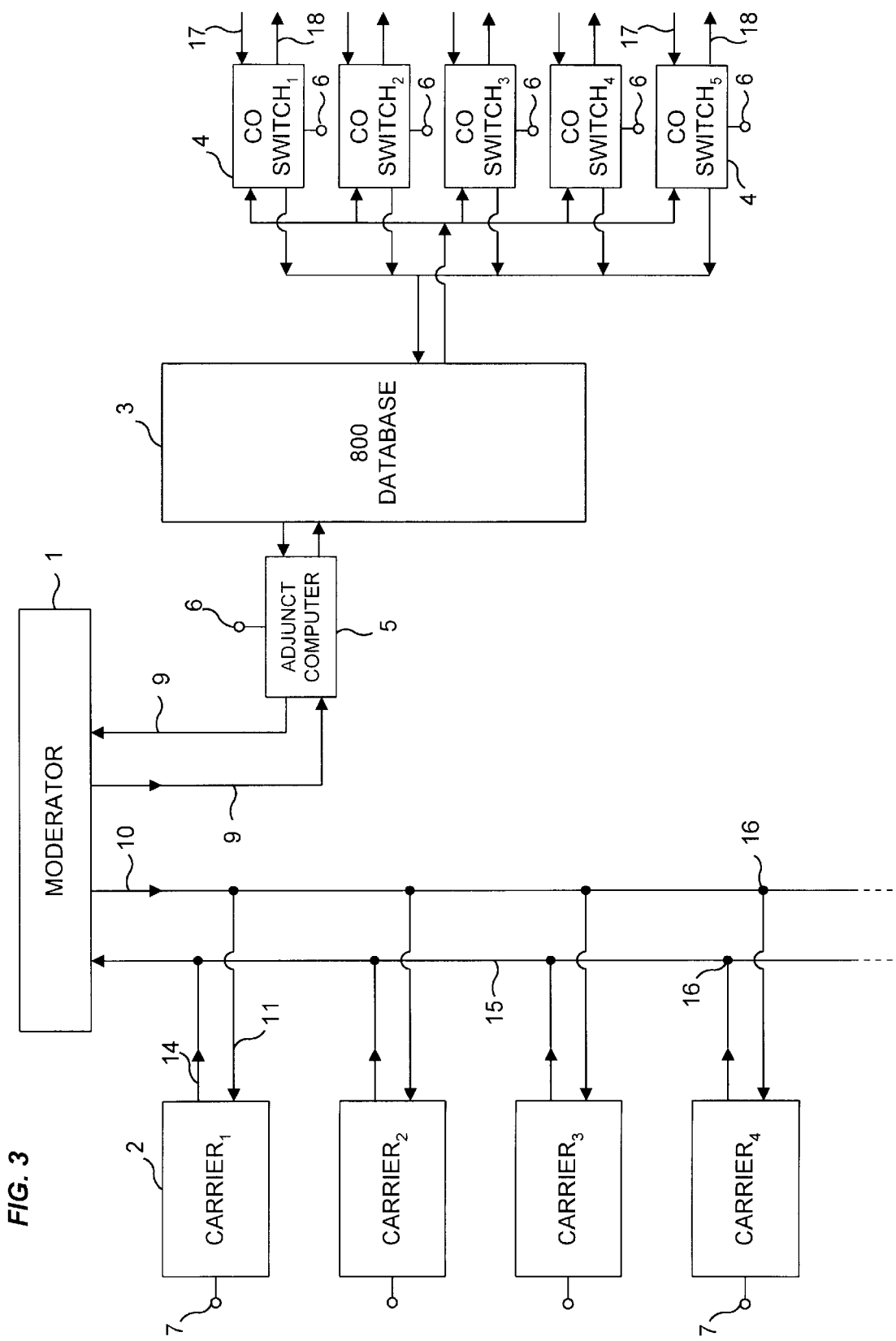
FIG. 3 is a schematic view of an exemplary system of the invention showing shared data links between the Moderator and the Carrier and between the 800 Database and the subscribing switches.

FIG. 3 illustrates an alternative network architecture in which the individual Carrier-to Moderator data links 14 share a common data input line 15 into the Moderator 1. This can be done, for example, by means of fiber optics using the SONET transmission protocol and ATM technology. This would require an ATM switching module at each junction 16 between the individual Carrier links 10, 14 and the common Moderator input-output links 10, 15. FIG. 2 illustrates bi-directional transmission using two transmission paths. However, such bi-directional transmission can be implemented over a single physical transmission line.

Figure 4:
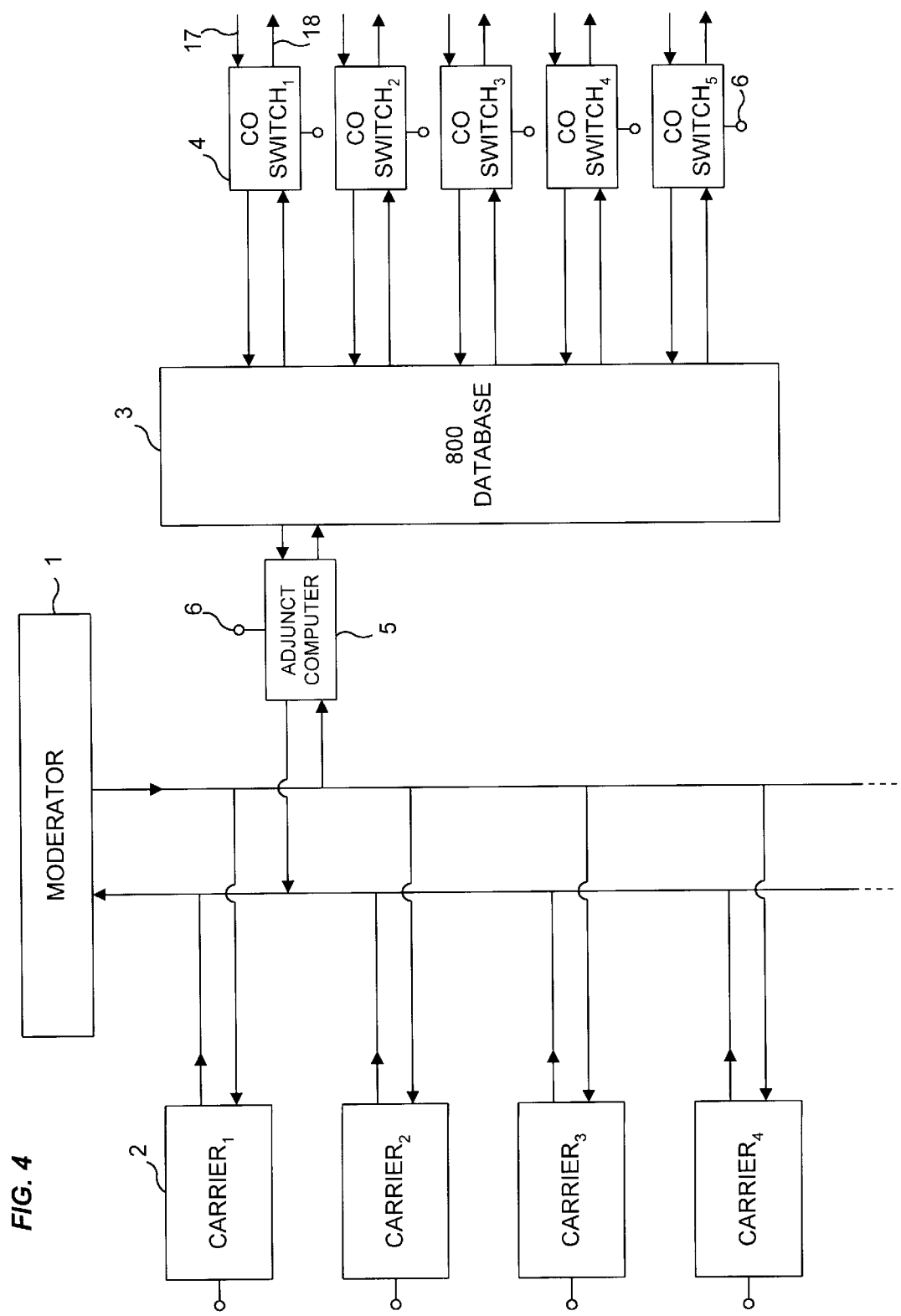
FIG. 4 is a schematic view of an exemplary system of the invention showing use of hared data facilities, such as a local area network, for communications between the Moderator nd the 800 Database.

FIG. 4 illustrates use of shared facilities between the Moderator 1 and a computer 5 adjunct to the 800 Database 3 and the Carriers' network management computers 2. This could be accomplished, for example, by many known local area network (LAN), metropolitan area network (MAN), and wide area network (WAN) technologies.

After processing the bids from each carrier, the Moderator transmits 76 carrier selection data to the 800 Database, as illustrated in FIG. 7. This is the same 800 Database queried, as part of the existing public switched telecommunications network architecture, by the local exchange carrier's central office switch whenever that switch is presented with a call to a toll-free number (e.g., calls with an NPA of 800 or 888 in the United States). The Moderator 1, or an adjunct computer 5 associated with the 800 Database 3 (and to which the Moderator has a data link 9 as illustrated in FIG. 2), transmits 76 a Carrier designation to the 800 Database for each toll-free number subject to the auction process (i.e., those 800/888 numbers assigned to participating 800 Customers). Each toll-free number's Carrier designation in the 800 Database will be updated periodically to reflect the results of the auction process. When the 800 Database is next queried 80 by a local exchange carrier's central office switch that has been presented with a call 79 to such a toll-free number, the 800 Database will respond 78 to the central office switch by providing the Carrier identifier for the Carrier most recently designated by the Moderator 1 (or adjunct computer 5) for calls to that toll-free number at that time. The central office switch will then route that call 81 to the interexchange Carrier so designated, as further illustrated in FIG. 11. The 800 Database may permit the Moderator to designate more than one Carrier for calls to be made to the same toll-free number in order, for example, to enable Carriers to bid on calls to that toll-free number from different originating switching points (e.g., from different NPA-NXXs). The appropriate designated Carrier for each call would be identified, for example, on the basis of the NPA-NXX of the central office switch making the query to the 800 Database or, perhaps, the 10-digit telephone number or ANI of the calling party.

The query by the central office switch to the 800 Database to determine to which Carrier the switch should route a toll-free call may also be implemented as illustrated in FIG. 8. When the central office switch is presented 79 with a call to a toll-free number and sends a query 80 to the 800 Database, the 800 Database will, in turn, send a query 82 to the Moderator (or an adjunct computer associated with the Moderator or 800 Database, and to which the Moderator has a data link 9, 12 as illustrated in FIG. 2) asking for the designated Carrier to which calls to this toll-free number should be routed at that time. The Moderator (or adjunct computer) responds to this query from the 800 Database by transmitting 83 the applicable carrier selection data, and the 800 Database then responds 78 to the earlier query from the central office switch by providing the designated Carrier identifier. The central office switch then routes that call 81 to the Carrier so identified, as further illustrated in FIG. 11. As described above, the 800 Database may designate more than one Carrier for calls to be made to the same toll-free number in order, for example, to enable Carriers to bid on calls to that toll-free number from different NPA-NXX originating switching points. The appropriate designated Carrier for each call would be identified, for example, on the basis of the NPA-NXX of the central office switch making the query to the 800 Database or, in the alternative, the 10-digit telephone number or ANI of the calling party.

Figure 11A:
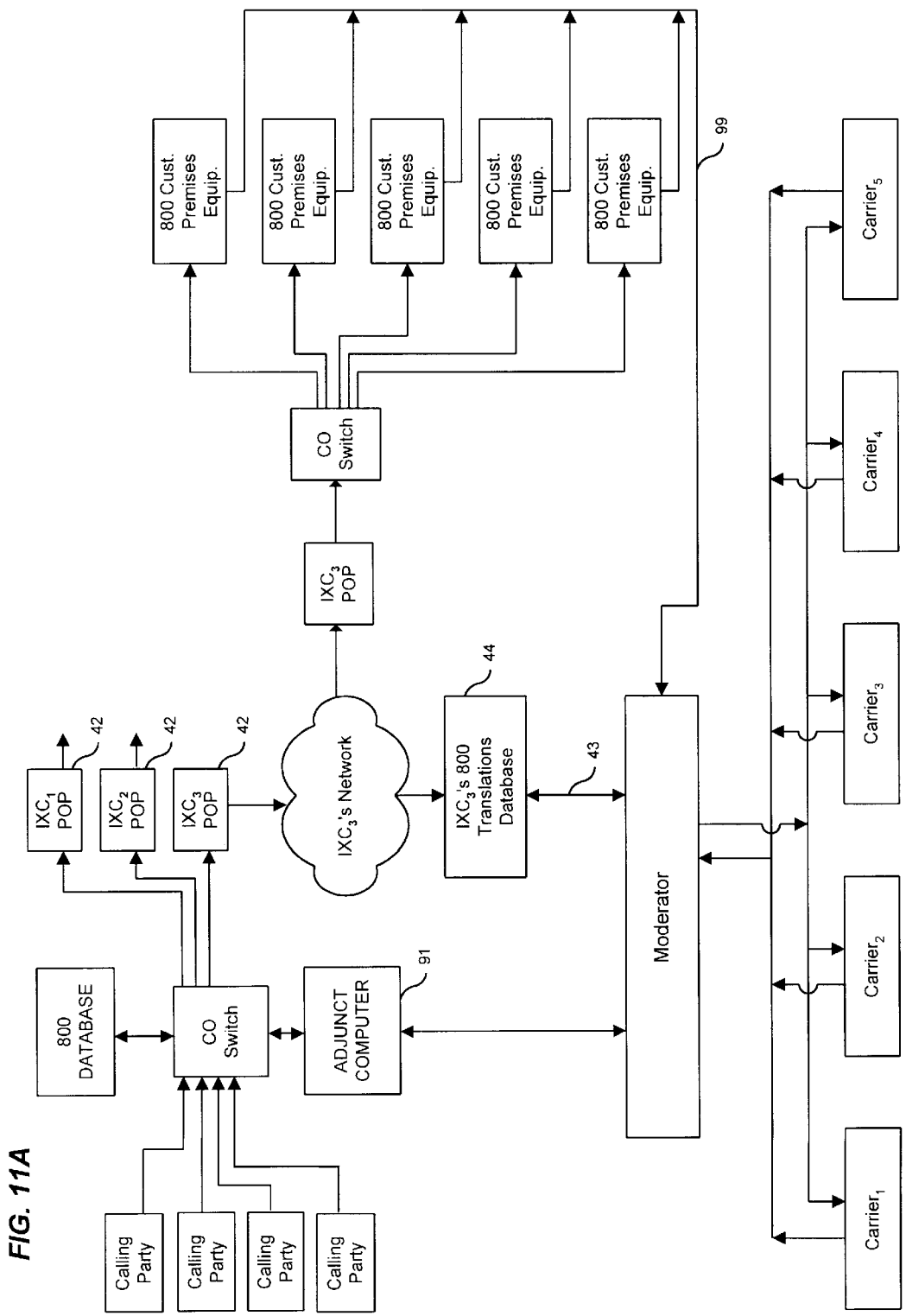
FIG. 11A is a schematic view of an exemplary network architecture showing transmission of bid information and/or carrier selection data from the Moderator to a subscribing switch via an adjunct computer.

Alternative implementations are available to the bidding service provider if the 800 Database administrator elects, for any reason, not to accommodate recurring changes (e.g., daily, hourly, or continuous) in the interexchange Carrier designation in the 800 Database for each toll-free number. In one alternative implementation, the Moderator would not designate the selected Carrier in the 800 Database (or at least not for calls to a toll-free number which originate from certain originating switching points, e.g., certain NPA-NXXs). Calls made to toll-free numbers of 800 Customers participating in the auction process would, like any other call to a toll-free number, trigger a query to the 800 Database by the central office switch associated with the calling party. If no interexchange carrier is designated in the 800 Database for that toll-free number, the "no-record" response (or its equivalent) by the 800 Database to the central office switch will trigger a second query by the central office switch, but in this case, as illustrated in FIG. 11A, the query will be sent to the Moderator or a computer adjunct to the central office switch (this could include a peripheral computer associated with a number of switches), particularly in the mode in which the Moderator periodically transmits bid information and/or carrier selection data to this adjunct computer. In response to such a query, the Moderator or such adjunct computer (whichever is sent the query by the central office switch) can transmit bid information and/or carrier selection information to this central office switch (or an adjunct computer associated with that switch). The central office switch can then route the toll-free call to the appropriate selected Carrier. Each participating central office switch (or an associated adjunct computer) gets the bid information and/or carrier selection information from the Moderator for all "point-to-point" routes originating in the local exchange area associated with that switch. From the list of all Carriers providing bid information to the Moderator, the Moderator or each central office switch (or an associated adjunct computer) can select those Carriers to which it wants traffic routed and can change that selection at any time. The Moderator would also transmit selected portions of the bid information it receives from other bidding Carriers to each participating Carrier's network management center.

Figure 20:
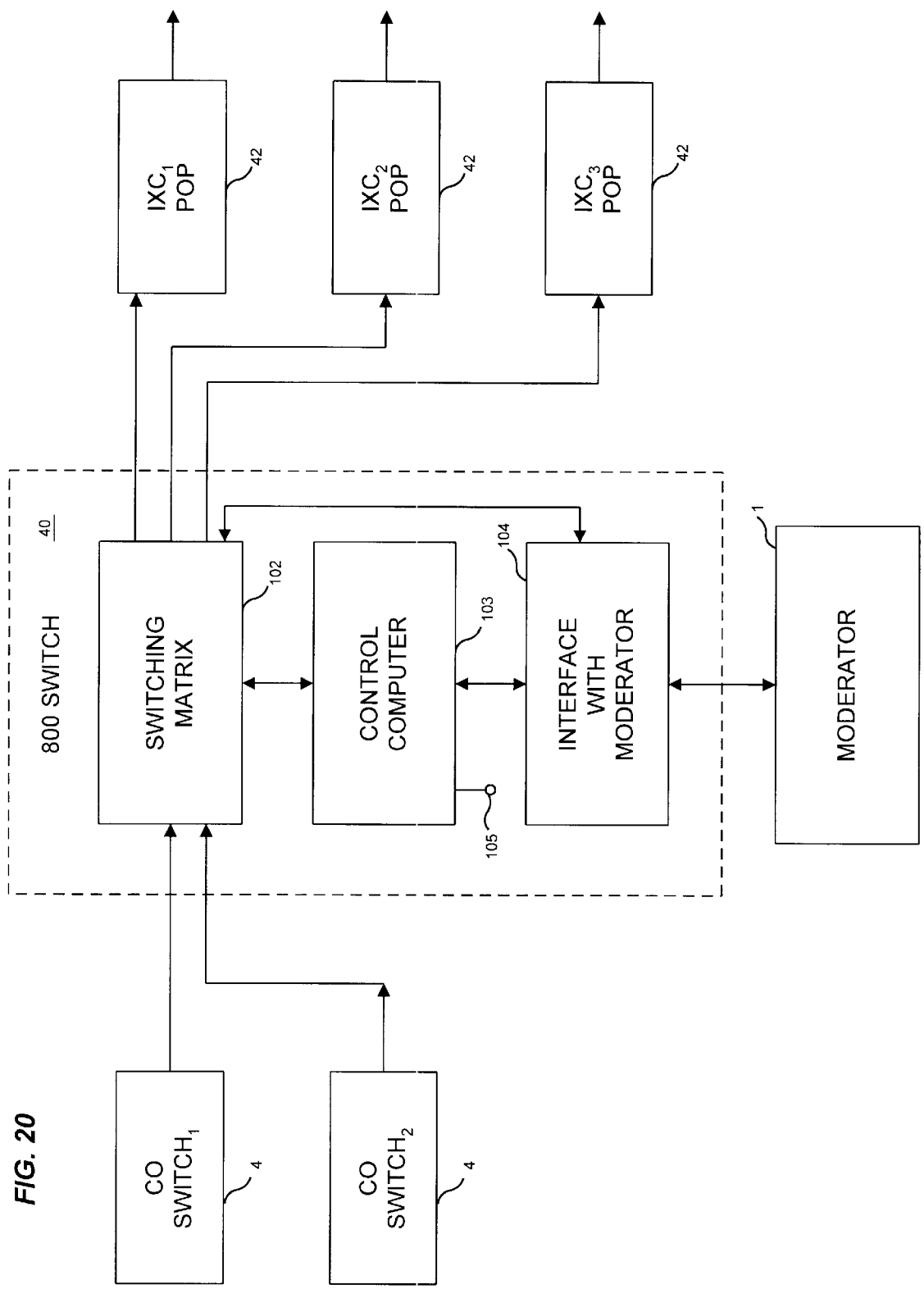
FIG. 20 is a schematic view of an exemplary system of the invention showing an 800 Switch with a switching matrix, a switch controller (control computer), an interface with the Moderator, and an input port for the switch administrator.

In a second alternative implementation available to the bidding service provider (if the 800 Database administrator elects not to accommodate recurring changes in interexchange carrier designations), the bidding service provider may elect to implement the routing of toll-free calls to selected Carriers by designating a particular carrier 40 in the 800 Database 3 (See, for example, FIG. 12). This carrier designation in the 800 Database 3 would seldom, if ever, be changed. Calls made to participating 800 Customers' toll-free numbers would be identified in the 800 Database as toll-free numbers assigned to this carrier 40. The 800 Database, in response to a query from a central office switch 4 presented with a call to such a toll-free number, would provide the Carrier identifier for this carrier. The central office switch 4 would then route this call to this carrier's local point-of-presence (i.e., in the same manner it routes any other toll-free call to the respective point-of-presence of the interexchange carrier identified by the 800 Database). Under this implementation, the central office switch would route the call to a switch 40 being used primarily to handle toll-free calls (the "800 Switch"), as illustrated in FIG. 12. The 800 Switch 40 (or an associated adjunct computer) can query the Moderator 1 for, or periodically receive from the Moderator, bid information and/or carrier selection information relating to the bidding interexchange Carriers and route each toll-free call to the appropriate selected Carrier 42. The Moderator would transmit selected portions of bid information and/or carrier selection information to each appropriate 800 Switch 40 (or an associated adjunct computer). Each 800 Switch 40 (or an associated adjunct computer) gets the bid information and/or carrier selection information from the Moderator for all "point-to-point routes" originating in one or more local exchange areas associated with that 800 Switch. From the list of all Carriers providing bid information to the Moderator, the Moderator or each 800 Switch (or an associated adjunct computer) can select those Carriers to which it wants traffic routed and can change that selection at any time. The Moderator would also transmit selected portions of the bid information it receives from other bidding Carriers to each participating Carrier's network management center. The 800 Switch 40, as illustrated in FIG. 20, has a switching matrix 102 controlled by a computer 103 with an interface 109 to the Moderator 1, and an input port 105 for use by an 800 Switch administrator. It also has input facilities to the central office switches it serves and output facilities to Carriers' points-of-presence 42.

Figure 6:
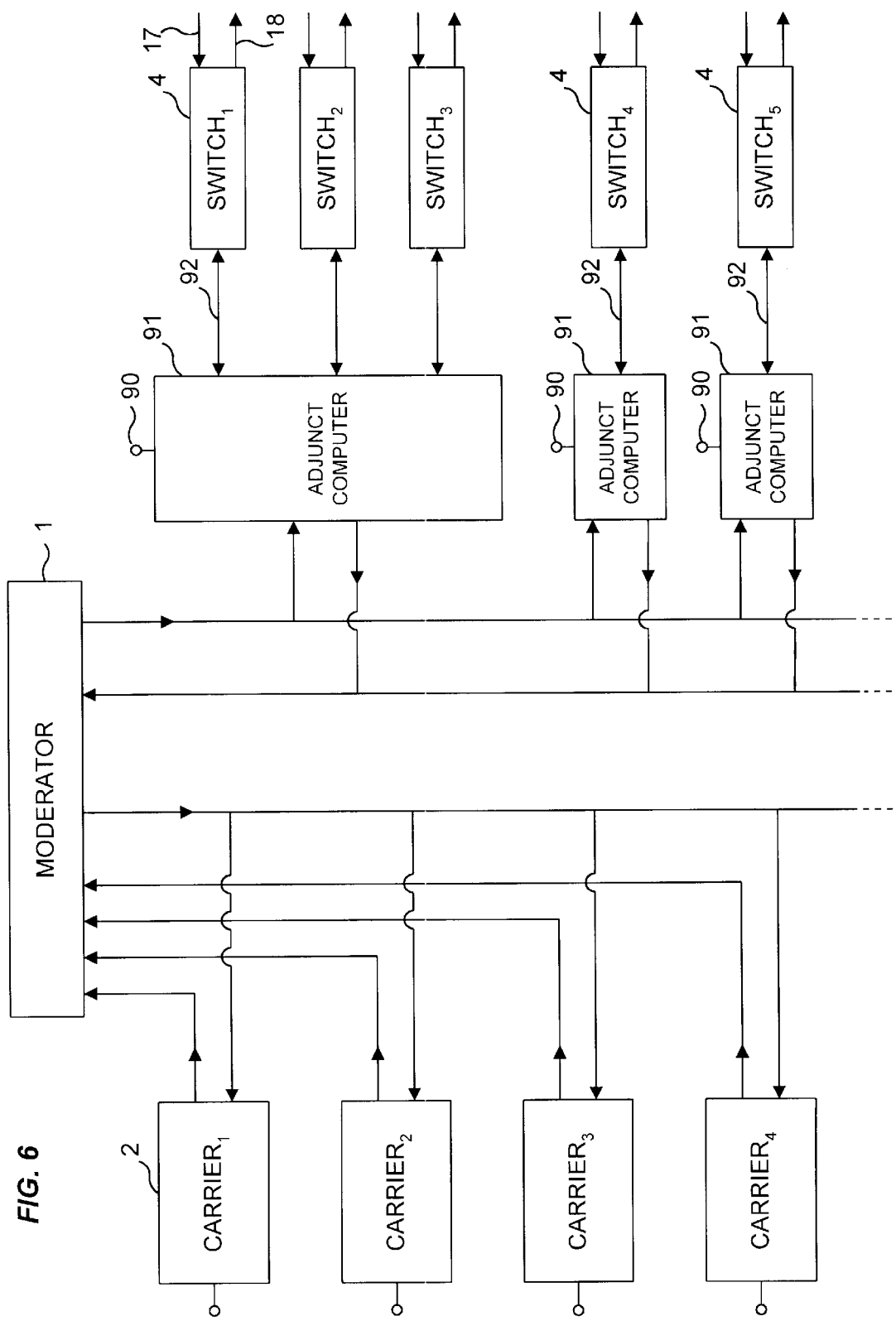
FIG. 6 is a schematic view of an exemplary system of the invention showing the use of shared data facilities for communications between the Moderator and one or more adjunct computers, and the use of dedicated data links for communications between the adjunct computers and the subscribing switches, whether such switches are local exchange carriers' central office switches or 800 Switches.

An adjunct computer is known in the art to be a computer, closely associated with a switch, that provides the switch's operating software additional data or operating logic to provide the switch with additional operational capability. As illustrated in FIG. 6, as well as in FIGS. 11A and 14A, while primary processing of the bid data to produce carrier selection data may be performed in the Moderator, the adjunct computer 91 can be employed to enter the bid information and/or carrier selection data received from the Moderator 1 into a database in its memory and receive, through input port 90, decision rules from the switch administrator. Software in the adjunct computer's processor can then access the data in memory and apply the decision rules to the bid information and/or carrier selection data, producing the data required to populate the routing tables of the least cost routing software in the switch 4. The adjunct computer 91 communicates with the switch 4 over a digital data link or data bus 92. If the switch 4 has enough processing capacity, the function of the adjunct computer 91 may be incorporated in the switch's processor and memory, the function being implemented in the processor by appropriate software. In this case the switch must also provide input ports to receive the transmission link from the Moderator and input 90 from the switch administrator. Each switch 4 receives call attempts over incoming lines 17. Each call attempt includes routing data identifying the toll-free number dialed. The switch's least cost routing software then selects the Carrier to which the call attempt shall be routed over outgoing line 18.

Figure 9:
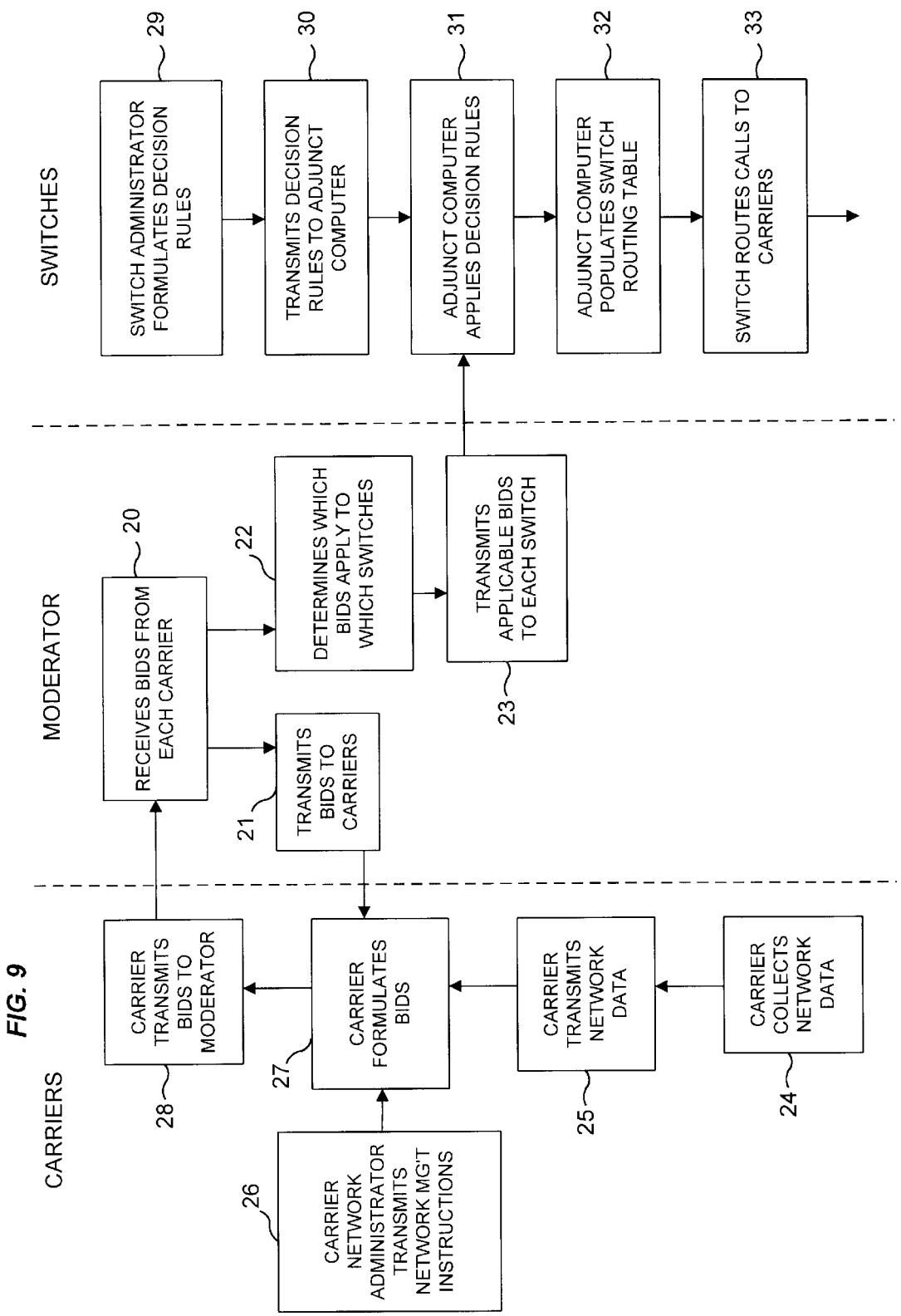
FIG. 9 is a schematic representation of an exemplary process of the invention in which the Moderator transmits bid information to a subscribing switch via an adjunct computer.
Figure 10:
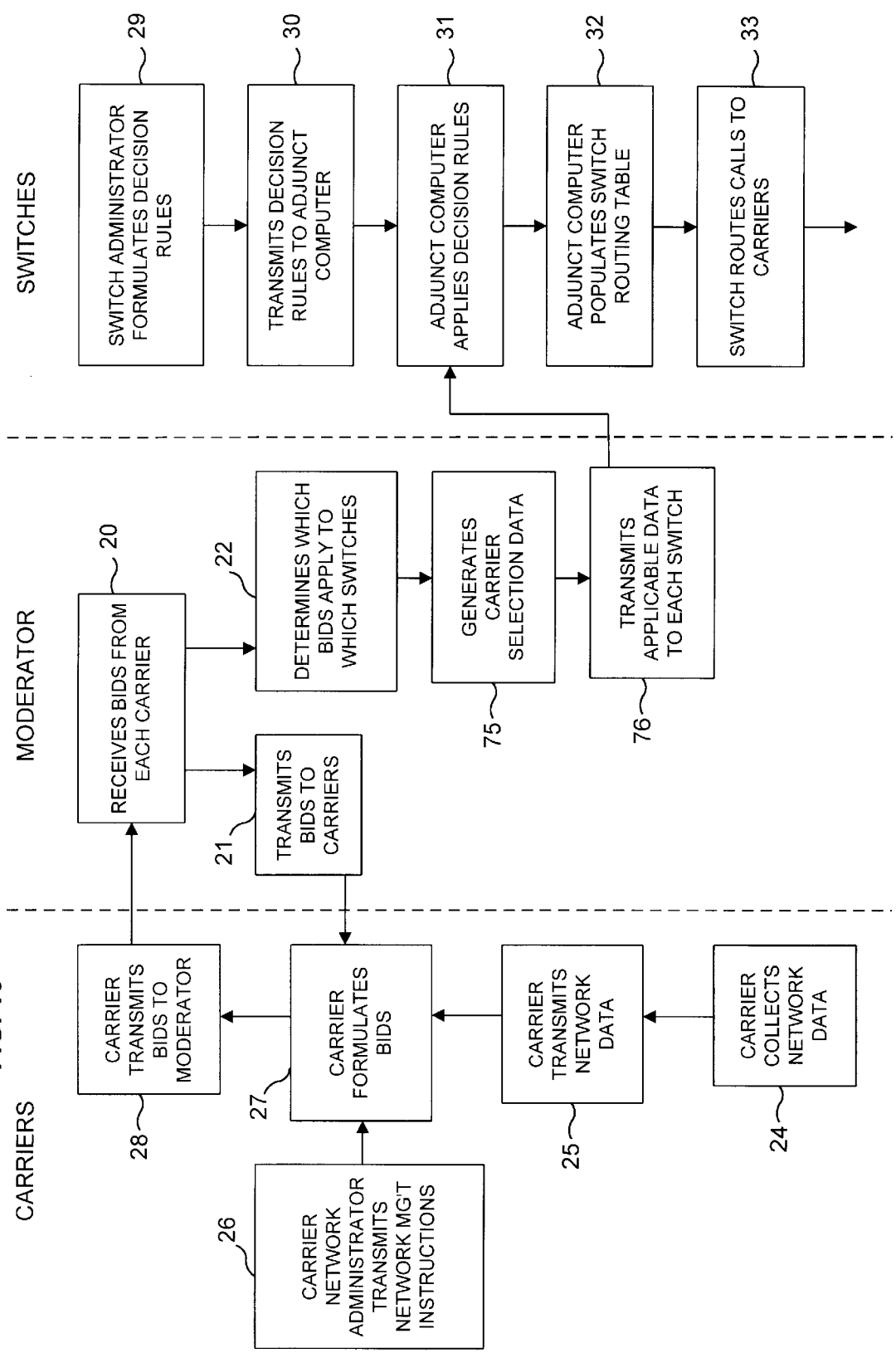
FIG. 10 is a schematic representation of an exemplary process of the invention in which the Moderator transmits carrier selection data to a subscribing switch via an adjunct computer.

In the implementation illustrated in FIG. 6, and further described in FIGS. 9 and 10, an adjunct computer 91, perhaps belonging to a local exchange carrier, receives the bid information and/or carrier selection data from the Moderator 1, further processes the data and controls Carrier selection in the switches 4 under its control. Routing tables in the switches 4 can be populated periodically by data from the adjunct computer 91 or the switch 4 can query the adjunct computer 91 as each call attempt is presented. The adjunct computer 91 can receive selection rules and other administrative directions from the Moderator or a local Carrier administrator through input port 90.

An evolutionary development in local exchange switch architecture is the combination of a "dumb" switch and a "smart" peripheral computer. In this arrangement the switch accomplishes the actual connection between incoming and outgoing telecommunication facilities and the switch operating software performs the management functions specifically supporting the switching function. The peripheral computer contains the service-related software. This arrangement permits the telecommunication service provider to modify its service offerings without the need to ask the switch manufacturer to change the switch's operating software. Through use of an intelligent peripheral computer, a local exchange carrier could, for example, control the routing of toll-free calls by all of its local exchange switches or other switches deployed for the purpose of routing such calls (e.g., the 800 Switch).

As in PBX least cost routing, the routing of a call attempt by a switch is dependent on population of a routing table. This table is a memory file containing carrier selection information or the cost (or other economic incentive) of call carriage over each route accessed by the switch. In accordance with the herein disclosed process for alternative implementations available to the bidding service provider (i.e., in which the Moderator communicates with an 800 Switch or a central office switch, directly or via an adjunct computer), this routing table could be populated by the Moderator, based on carrier selection data it generates, or by a computer adjunct to the switch, based on decision rules entered by the Moderator or by a switch administrator. Or, with appropriate software, the adjunct computer function could be incorporated in the switch's peripheral computer. With this combination of software implementations, a telecommunication service provider could offer least cost routing service, at economically advantageous rates based on a bidding process, to all 800 Customers, large and small.

Figure 5:
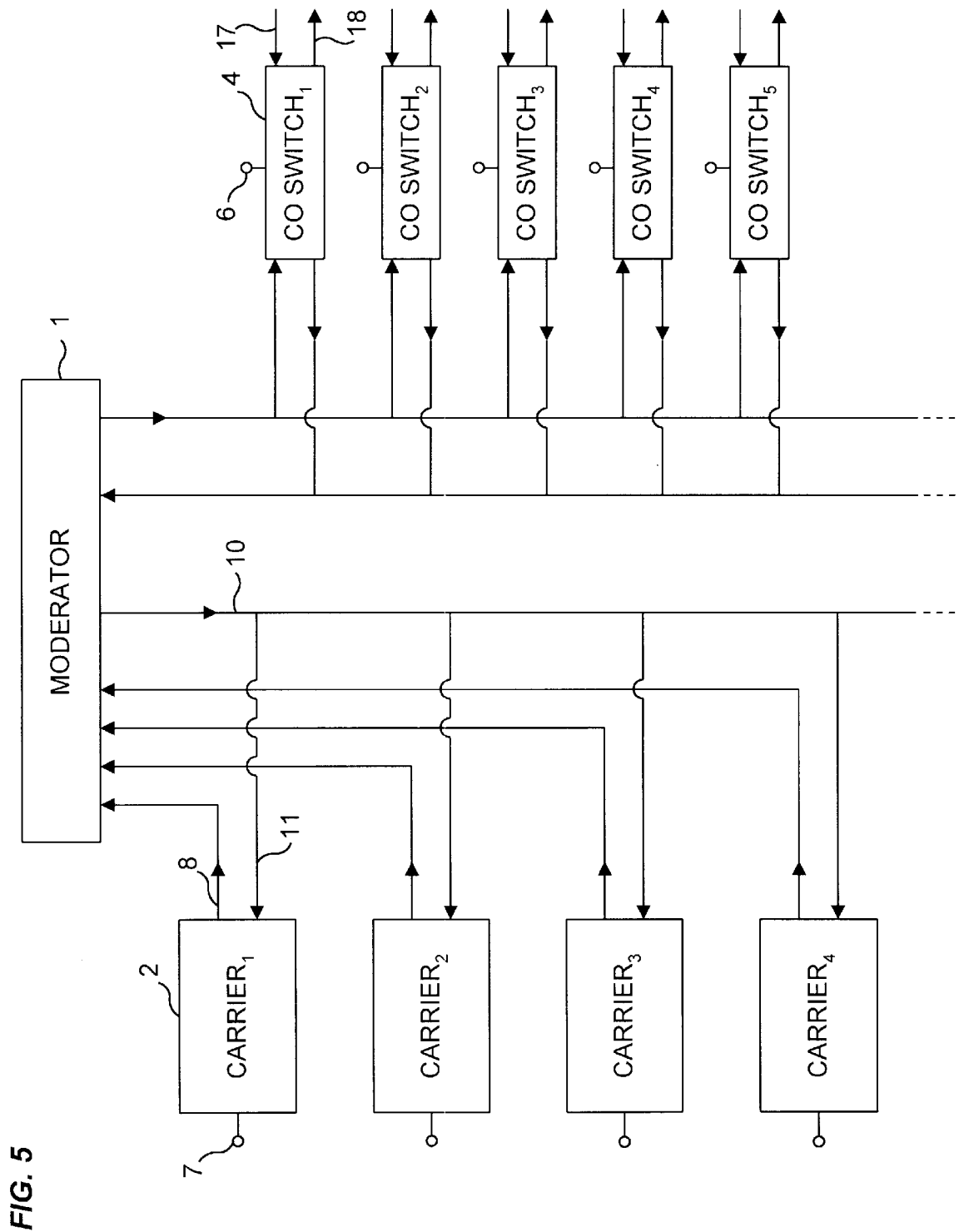
FIG. 5 is a schematic view of an exemplary system of the invention showing the use of shared data facilities for communications between the Moderator and the subscribing switches, whether such switches are local exchange carriers' central office switches or 800 Switches.

As illustrated in FIG. 10, the routing table can be populated with derivative data generated 75 in the Moderator by further processing of the economic incentive data. This could include carrier selection data, prioritizing the Carrier selection in accordance with Carriers' bids for each route originating at the switch. The applicable data can be transmitted 76 to each switch, including those in which the adjunct computer populates the switch's routing table 32. While some of the decision making process has been performed by the Moderator (i.e., sorting its bids and generating carrier selection data), the switch makes the ultimate Carrier selection based on network conditions and decision rules from the switch administrator 29 or the Moderator. The network architecture involved is as illustrated in FIG. 5, where the switch 4 represents the combination of the dumb switch and the intelligent peripheral computer, or as illustrated in FIG. 6, where the switch 4 and adjunct computer 91 are associated (but not necessarily combined), with the input and output links 17, 18 representing in each figure all of the telecommunication facilities accessed by the switch 4.

In each of the above implementations of routing calls to selected Carriers according to an auction process, the selected Carrier will perform the translation of the dialed toll-free number to the specific destination of such call (e.g., the called party's NPA-NXX-XXX under the North American Numbering Plan) and then route the call to that destination. The Moderator can transmit, via data link 43, the NPA-NXX-XXXX associated with each toll-free number (for 800 Customers participating in the auction process) to each participating Carrier's toll-free number translation database 44 ("800 translation database") to enable each Carrier to execute a translation if a call to a toll-free number is routed to its network by a local exchange carrier's central office switch or by an 800 Switch. As an alternative, the Moderator (or an adjunct computer) could provide the 800 Database with the NPA-NXX-XXXX translation for each such toll-free number and the 800 Database could provide this translation to the central office switch when the 800 Database responds to the switch's query whenever the switch is presented with a toll-free call. If a central office switch queries the Moderator directly, the Moderator (or an adjunct computer) could provide the central office switch (instead of the 800 Database) with the NPA-NXX-XXXX translation for each such toll-free number and the central office switch could execute a translation whenever this central office switch is presented with a toll-free call. If an 800 Switch is routing toll-free calls to selected Carriers, the Moderator (or an adjunct computer) could provide the 800 Switch (instead of the 800 Database) with the NPA-NXX-XXXX translation for each such toll-free number and the 800 Switch could execute a translation whenever the 800 Switch is presented with a toll-free call.

The economic choices presented to telecommunication service users under this invention depend on bids submitted by Carriers for telecommunication traffic over the routes they serve as part of the various telecommunication networks available to the users. A "route" is service from the "originating switching point," i.e., the switching point on a telecommunications network that serves as the most immediate switching interface between the calling party and that telecommunications network (e.g., a local exchange switch or equivalent local switching node, whether hardware or software-defined, providing access to that network), to the "terminating switching point," i.e., the switching point on a telecommunications network (which may, but need not be, owned or operated by the same carrier who owns or operates the originating switching point) that serves as the most immediate switching interface between the called party and that telecommunications network (e.g., a local exchange switch or equivalent local switching node, whether hardware or software-defined, providing access to that network). A route may also have an originating point and a terminating point in the same local exchange area.

A local exchange switch (or equivalent local switching node) is generally considered to be (i) the switching point on a telecommunications network that serves as the most immediate switching interface between the calling party and that telecommunications network as well as (ii) the switching point on a telecommunications network (which may, but need not be, owned or operated by the same carrier who owns or operates the originating switching point) that serves as the most immediate switching interface between the called party and that telecommunications network, regardless of whether such telecommunications networks use circuit-switched, frame relay, asynchronous transfer mode, packet data, TCP/IP protocols or other current or evolving telecommunication technologies. Local exchange switches (or equivalent local switching nodes), for example, may include telephone companies' local central office switches, private telecommunications networks' local access nodes, and Internet service providers' local access switches—whether represented by a server, router or other switching device (which may be hardware or software-defined), but in each case providing access to the respective telecommunications network.

To identify originating and terminating switching points for telephone calls within North America, for example, each local exchange switch on the public switched telephone network is designated in the North American Numbering Plan by a unique NPA-NXX code, where the NPA is a three digit numbering plan area identifier (e.g., area code 201 identifies Northern New Jersey) and NXX is a three digit code identifying a particular local exchange switch within the numbering plan area. It is common for a single local exchange switch to house more than one NXX Code. The interexchange Carriers that utilize this bidding process are usually identified by a Carrier access code. This code may be, for example, a "1" signifying the end user's primary Carrier, a 5 digit code "10XXX" for a Carrier other than the end user's primary Carrier, or some other code or data element designated for that purpose. Once a Carrier is selected for a call attempt, the appropriate Carrier access code may be inserted in the call attempt's routing data (e.g., NPA-NXX-XXXX, the last four digits identifying the particular line served by the called party's NPA-NXX switch on the public switched telephone network).

The subscribing switch may also have dedicated direct links to one or more Carrier points of presence on any telecommunications network. If such a Carrier is selected, the subscribing switch would route the call attempt directly to that dedicated link. The 800 Switch 40, as illustrated in FIG. 13, would be most efficient using dedicated direct links to the Carriers 42, though it can be equipped to operate using shared or common facilities, for example, as part of a local exchange carrier's switched network.

While the currently predominant numbering scheme for originating and terminating switching points on the public switched telephone network is the North American Numbering Plan, other numbering schemes identifying originating switching points and terminating switching points are possible, particularly for other types of telecommunication networks, and may be used as telecommunication technology evolves. International telephone calling, for example, currently uses a country code and a city code before the code that identifies the local exchange switch on the public switched telephone network.

Carriers may submit bids to the Moderator for routes over different types of telecommunications networks (e.g., circuit-switched, frame relay, asynchronous transfer mode, or packet data networks such as the Internet) and for different classes of telecommunications service provided by such networks (e.g., transmission of voice, data, or video). Access to such telecommunications networks or facilities by end users or by other telecommunications carriers or service providers may be, for example, via the public switched telecommunications network, dedicated facilities, private lines, wireless facilities, coaxial cable, electric utility power lines, Ethernet or other local area network (LAN), metropolitan area network (MAN) or wide area network (WAN) connections.

The competing Carriers bid for traffic by transmitting to the Moderator the economic incentive each Carrier will offer for traffic over each route it serves (or, at least, each route it wishes to compete for using the bidding process). The economic incentive presently contemplated as being most usual is the rate (amount of money charged per unit of time). However, many other kinds of economic incentive may be offered, such as a credit toward other services (e.g., frequent flyer points) or a credit toward an additional rebate that may be offered if a user's traffic for a given month (or that of another telecommunications service provider reselling, for example, a participating Carrier's service) rises above a threshold. The economic incentive could be a combination of rate and another incentive. But the economic incentive should be selected from a limited set authorized by the provider of the bidding mechanism, because the incentive must be capable of being evaluated by the software in the Moderator or in each subscribing switch's adjunct computer. A Carrier may wish to submit more than one bid for routes that terminate using more than one class of service (e.g., call completion via switched service for some toll-free calls, call completion via dedicated access facilities for others). Each bid must be associated with a time period within which the bid will be effective.

The rules of the bidding process can be structured in many ways. The following are examples of possible bidding rules:

a) The day is divided into blocks of time by the bidding service provider and bids are submitted for each block of time. All bids for a given block of time must be submitted prior to a cut-off time that precedes that block of time by a protection interval. Any bid received after the cut-off time is considered to be effective for the next block of time, unless a new bid is subsequently received from the same Carrier for that route. The protection interval is needed to permit processing of the bid information by the Moderator and transmission, prior to the bid's start time, of carrier designation data to the 800 Database or, in lieu thereof, transmission of carrier selection data and/or bid information to the subscribing switch (or an associated adjunct computer). For example, if thirty minute blocks of time arc auctioned, a five-minute protection interval may be appropriate.

b) Carriers are permitted to submit bids for any time interval by specifying a start time and a termination time or a start time and a good-until-cancel instruction. However, no bid can be effective before a protection time interval specified by the bidding service provider. The bidding service provider can provide confirmation of received bids back to the Carrier if the data link from the Moderator to the Carriers is provided with a selective messaging capability.

c) Carriers may be permitted to enter default bids for any route and/or block of time for which they transmit no other bid.

d) As a fail-safe mechanism, to avoid use of old bids that have not been changed due to communication failure, the Moderator may impose a rule setting a time limit (a fail-safe protection time) to the applicability of any bid. At the expiration of the time limit, the expired bid could default to a preset default bid or to no bid. Such a rule could also be built into the 800 Database software (or the software of the subscribing switch, or its associated adjunct computer, if the bidding service provider utilizes one of the previously-described alternative implementations) to protect against a failure in the Moderator-to-800 Database data link or the Moderator-to-switch data link, respectively.

The principal data feedback from the Moderator to the Carriers is the transmission of bidding data from the Moderator to each of the Carriers. This permits the Carriers to adjust their own bids for any particular route in view of other Carriers' bids for that route. In a block of time bidding scheme this transmission may take place, in different service offerings, either before or after the bid cutoff time for a given block of time. If transmitted before the cutoff time, the Carriers have an opportunity, up to the cutoff time, to adjust their bids for that block of time. If the service is arranged for transmission back to the Carriers after the cutoff time, the Carriers can adjust their bids for the next or subsequent blocks of time. If the bids are transmitted back to the Carriers after the cutoff time but before the bid's effective time, the Carriers would be able to manage their networks to take account of that time interval's bid structure. The bids can be adjusted to be lower or higher, depending on whether the Carrier, in view of the state of its network traffic, wishes to further encourage or discourage additional traffic. The Carrier may wish to reduce its bid, for example, to encourage additional traffic on an underutilized telecommunication facility, or increase its bid to discourage traffic over a facility approaching a congested state. Depending on the transmission and computer technologies used, transmission back to the Carriers could also be accomplished by posting the bids on a bulletin board system, making them available for retrieval by all Carriers.

The bid information and/or carrier selection information being transmitted between the Moderator, the Carriers, and the 800 Database and/or subscribing switches is sensitive business information and may need, under various circumstances, to be encrypted. Depending on how the service is arranged, there may be a need to protect the privacy of bids from interception by other participating Carriers or from interception by non-participating Carriers. Some of the most sensitive information would be bid information sent from the Carriers to the Moderator and bid confirmation messages from the Moderator to the Carriers. Some less sensitive information would be the bids transmitted back to all participating Carriers after the cutoff time for a given block of time. There are several encryption schemes known in the art for such use, including the RSA and PGP schemes.

FIGS. 7 and 8 illustrate exemplary implementations of the auction process of this invention in which the interexchange carrier designations in the 800 Database are updated by the Moderator periodically or in response to queries from the 800 Database. The process is carried out by (i) participating interexchange Carriers, acting through their network management computers, (ii) the bidding service provider, acting through the Moderator computer, (iii) the 800 Database and (iv) local exchange carriers' central office switches. The Moderator receives bids from each Carrier specifying the economic incentive the Carrier is willing to offer for carrying a call over each route for which it wishes to place a bid. This information is stored in the Moderator computer's memory. At a time appropriate to the particular service arrangement in operation, the Moderator transmits 21 bids received from the Carriers to at least a portion of the Carriers. The Moderator also processes the data in a sorting operation to determine which bids, and/or carrier selection data derived from the bids, are for routes that have an originating switching point associated with each central office switch and/or a terminating switching point associated with a specific toll-free number. After processing the bids from each Carrier, the Moderator provides 76 carrier selection information to the 800 Database, either as a transmission initiated by the Moderator, as illustrated in FIG. 7, or in response 82 to a query from the 800 Database, as illustrated in FIG. 8. When the 800 Database is next queried 80 by a central office switch that has been presented with a call 79 to such a toll-free number, the 800 Database will respond 78 to the central office switch by providing the Carrier identifier for the Carrier most recently designated by the Moderator (or adjunct computer) for calls to that toll-free number at that time. The Moderator may have already updated that Carrier designation in the 800 Database, as illustrated in FIG. 7, or the 800 Database (before responding to the query by the central office switch) may launch 82 its own query to the Moderator to obtain the current Carrier designation, as illustrated in FIG. 8. The central office switch will then route that call 81 to the interexchange Carrier so designated, as further illustrated in FIG. 11.

FIGS. 9 and 10 illustrate exemplary implementations of the auction process of this invention in which the carrier designations in the 800 Database do not change on a continuing basis. Instead, an 800 Switch or a central office switch communicates 23 directly (or via an adjunct computer) with the Moderator to receive the Carrier designations applicable to each toll-free call. The Moderator receives bids 20 from each Carrier specifying the economic incentive the Carrier is willing to offer for carrying a call over each route for which it wishes to place a bid. This information is stored in the Moderator computer's memory. At a time appropriate to the particular service arrangement in operation, the Moderator transmits 21 bids received from the Carriers to at least a portion of the Carriers. The Moderator also processes the data in a sorting operation to determine which bids, and/or carrier selection data derived from the bids, are for routes that have an originating switching point associated with each subscribing switch and/or a terminating switching point associated with a specific toll-free number and transmits 23 the appropriate bids and/or carrier selection data to each such subscribing switch. As illustrated in FIGS. 11A and 12, respectively, a subscribing switch may be a local exchange carrier's central office switch or an 800 Switch, in both cases receiving bid information and/or carrier selection data, directly or via an adjunct computer, from the Moderator.

Each subscribing switch is operated by a switch administrator who may formulate 29 decision rules. A decision rule may be, for example, a simple instruction to switch a call attempt to the Carrier that has submitted the lowest cost bid. The rules may include, for example, an instruction to route all calls in a particular time period (e.g., from midnight to 6:00 A.M.) to a particular Carrier to satisfy the requirements of a contract between the switch's owner and that Carrier, or because that contract Carrier has contracted to carry all traffic during that time period for a flat monthly fee. At all other times, the decision rules might include an instruction to route calls to this contract Carrier only if its contract rate is lower than the lowest bid submitted to the Moderator by the other Carriers. The switch administrator may also instruct the switch or an associated adjunct computer to value a non-rate economic incentive in a particular way. As illustrated in FIG. 9, the bids and decision rules may be received 23, 30 by the switch or associated adjunct computer and stored in a data base in its memory. The switch or associated adjunct computer may apply 31 the decision rules to the economic incentive data received as bids and generates the carrier selection data needed to populate 32 the switch's routing table. The switch administrator may also formulate the decision rules and transmit them to the Moderator. In the alternative, the decision rules may be formulated by the Moderator or the 800 Customer. If formulated by the 800 customer, the decision rules may be transmitted to the Moderator, via data link 99, as illustrated in FIGS. 11–17. The rules may include, for example, an instruction to route all calls made to a toll-free number during a particular time period (e.g., from midnight to 6:00 A.M.) to a specified Carrier to satisfy the requirements of a contract between the 800 Customer and that Carrier, or because that Carrier has contracted to carry all toll-free traffic for that 800 Customer during that time period for a flat monthly fee. Whether the decision rules are formulated by the Moderator, or by the 800 Customer or the switch administrator and transmitted to the Moderator, the carrier selection data can be generated 75 by the Moderator after taking these rules into account, as illustrated in FIG. 10. The Moderator can transmit 76 the carrier selection data to the switch periodically, when generated, or in response to a query from the switch. The query can call for the carrier selection data in full or on a call-by-call basis.

The routing table is the file that is accessed by the switch's least cost routing software to decide which Carrier will receive a call attempt. The software will also provide for treatment of failed call attempts (e.g., retry, try the next lowest cost Carrier, or default to the contract Carrier). When a call attempt is presented to the switch, a routing decision is made and the call routed to a Carrier for transmission to the call's destination. In order to route a call, the subscribing switch's operating software connects the input register carrying the call attempt to the output register connected to telecommunications facilities which connect to the selected interexchange Carrier's point of presence.

To reduce the exposure of 800 Customers (and resellers) to the potential volatility of prices offered via the auction process, default Carriers may participate. If, for example, prices bid in the auction rise above a fixed upset price previously agreed to by the default Carrier, the Moderator could select the default Carrier as the winning bidder. The Moderator may negotiate with one or more Carriers to serve as default Carriers. In the alternative, an 800 Customer or group of 800 Customers (or a reseller) may wish to specify to the Moderator that a particular Carrier be designated as that 800 Customer's or reseller's default Carrier (e.g., a telecommunications service provider who has entered into a contract with the 800 Customer or reseller to carry a significant portion of that 800 Customer's or reseller's telecommunications traffic outside of the auction process).

The Moderator can also accommodate 800 Customers (and resellers) who wish to limit the group of Carriers from whom the Moderator will evaluate bids when a Carrier is to be selected for call attempts to such 800 Customers (or to customers of such resellers). An 800 Customer (or reseller) may wish to request of the Moderator that each of its calls be routed to one of a set of Carriers specified by that 800 Customer (or reseller). The Moderator, in compliance with this request, will include the bids of only this set of specified Carriers when generating carrier selection data for call attempts to such 800 Customers.

The bidding process can also accommodate 800 Customers (and resellers) who wish to employ a strategy of purchasing telecommunications service at the lower of the bid price in the auction or a negotiated price they agreed to pay a telecommunications service provider under a term contract. The Moderator or the subscribing switch can include this contract price, along with the bids it evaluates each time telecommunications service is provided to this 800 Customer (or customers of such reseller). If the contract price is lower than all of the other bids, the Moderator would select the contract carrier as the carrier of choice for that 800 Customer (or reseller). If the contract price is higher than any of the other bids, the Moderator would select the low bidder instead. The contract price could serve as a ceiling while the 800 Customer (or reseller) can still capture the benefit of low prices made available via the auction process (e.g., at night when system-wide excess capacity is greater than during peak daytime periods). To ensure that this 800 Customer (or reseller) can satisfy the volume commitments that would likely be part of any attractively-priced contract, the Moderator could enable this 800 Customer (or reseller) to designate from time to time (e.g., during certain peak demand daytime hours) that the contract price is to be treated as the low bid available to that 800 Customer (or reseller) at that time. At other times the Moderator will consider all bids submitted by other carriers as well as such contract price.

On certain types of telecommunication networks (e.g., packet data networks), a call attempt presented to a switch, for which a routing decision can be made, may consist of all or only part of the message or information (whether voice, data, video, etc.) being transmitted during the call by the calling party to the called party. For example, on packet data networks, when a calling party sends a data file to the called party, the network infrastructure would break up this file into a series of individual packets that are separately addressed and transmitted to the called party. Each of these packets may cross over different paths in traveling from the originating switching point to the terminating switching point. Each packet can be treated as a call attempt and a routing decision can be made for each packet.

As illustrated in FIGS. 7–10, the transmission of bid information between the Carriers and the Moderator is a feed back process. Each Carrier transmits 28 its economic incentive bids to the Moderator and the Moderator transmits 21 received bids to each Carrier or at least the portion of the Carriers appropriate to each bid. The Carrier starts its bid formulation by collecting 24 network data, such as the capacity and traffic loading of each network facility, and transmitting 25 this network data to the Carrier's network management computer. The network data can be entered by keying it in or entered over a data link from the Carrier's network operations systems. The Carrier's network administrator enters network management instructions (e.g., by keying them in or by data link), such as the fact that a particular facility is being taken out of service for maintenance or has a trouble that reduces its transmission capacity. The network management instructions could also be based on network performance characteristics, such as response time, or competitive business factors, such as the intent to compete more intensively for traffic to a specific region of the country or over routes that compete directly with another specified Carrier.

Software within each Carrier's network management computer then accesses its memory for the network data, the network management instructions, and the bid data received from the Moderator and determines 27 the economic incentive the Carrier will bid for traffic over each route. These data are accessed by means of the data buses and registers commonly internal to a computer. These bids are stored in the computer memory and transmitted 28 to the Moderator. Since the network management computer has access to the bids of other Carriers, during each bidding cycle each Carrier has the opportunity to adjust its bids in view of the bids of the other Carriers for traffic over each route. This adjustment may be accomplished automatically by the software in response to the network management instructions, or may be accomplished by direct input from the network administrator viewing displayed bidding data. The result of such adjustment consideration may be a decision to leave the bid as originally calculated, as being appropriate to accomplish the network administrator's objective.

The toll-free carrier routing service described above can also be advantageously operated as a least cost routing service without providing the Carriers with the bids of other Carriers. In this service each Carrier determines its bids based on its own business incentives and network management data. All other aspects of this service operate in the same way as the toll-free auction service.

Figure 14:
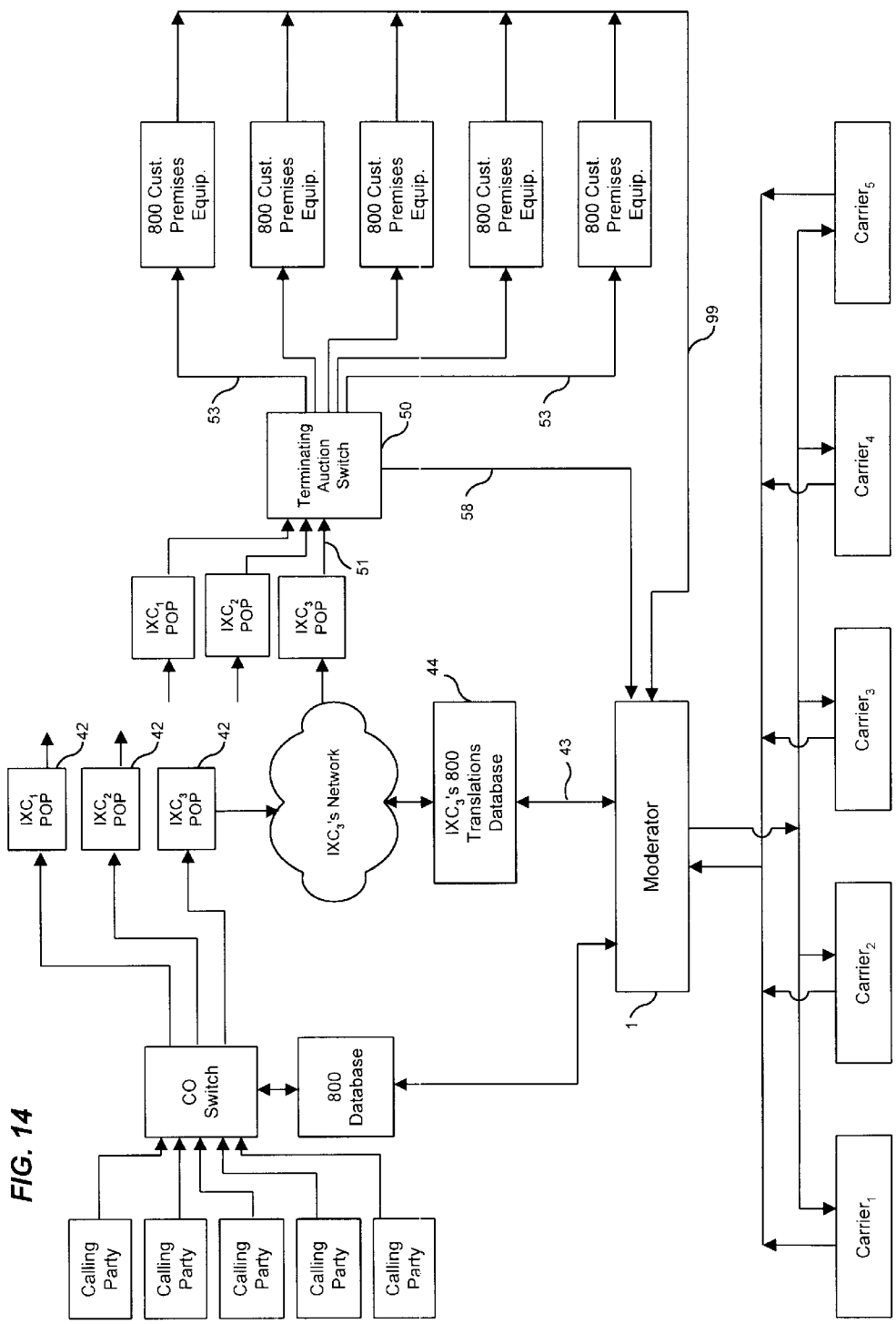
FIG. 14 is a schematic view of an exemplary network architecture in which the 800 Database receives Carrier designations from the Moderator via data link and calls are routed to a terminating auction switch, which then sends such calls via dedicated facilities to the 800 Customer's premises equipment.
Figure 14A:
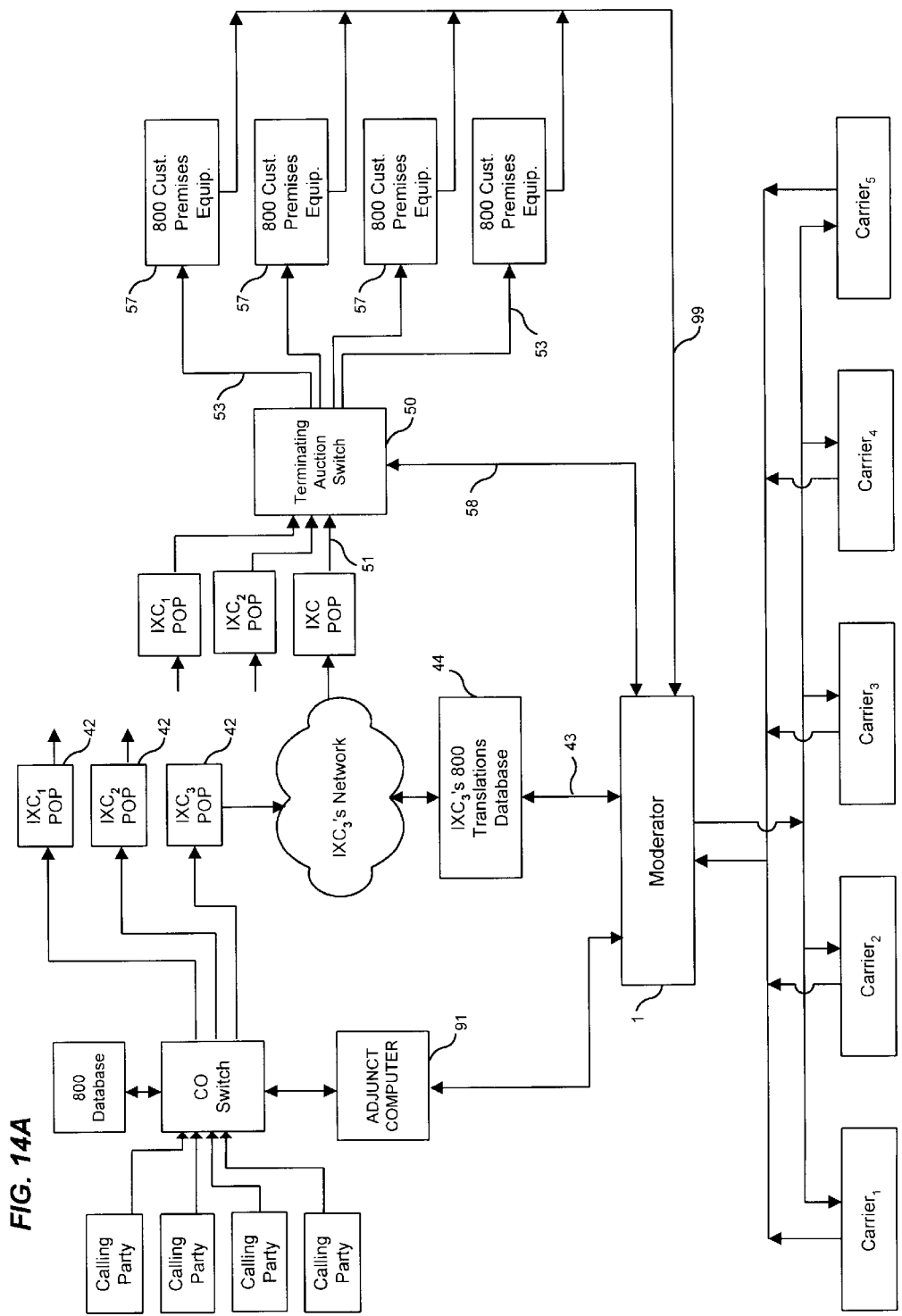
FIG. 14A is a schematic view of an exemplary network architecture in which the local exchange carrier's central office switch receives Carrier selection data from the Moderator via an adjunct computer and calls are routed by the selected Carrier to a terminating auction switch.

Most large 800 Customers today receive almost all of their incoming calls to a toll-free number over dedicated access facilities from only one interexchange Carrier. FIG. 14 illustrates a network architecture that enables large 800 Customers 61 (e.g., inbound 800/888 customer service centers) to receive telecommunication traffic from several interexchange Carriers over dedicated access lines to take advantage of the auction process. In this new architecture each call will be routed, as described previously, to an interexchange Carrier selected as part of the auction process at the originating end of the call. Upon reaching the selected Carrier's local point-of-presence serving the destination NPA-NXX, as further illustrated in FIG. 15, dedicated facilities 51 carry calls from such Carrier's local point of presence to a switch 50 (the "Terminating Auction Switch"), perhaps by way of a serving wire center 52, the switch 50 being equipped with input and output ports adapted to receive dedicated facilities. The telecommunication facilities from each Carrier's local point-of-presence to the Terminating Auction Switch would preferably also be shared facilities, carrying toll-free traffic handled by that Carrier's local point-of-presence for many 800 Customers. The Terminating Auction Switch 50 will sort out which toll-free calls are to be sent to which 800 Customers and then route them accordingly over dedicated access facilities 53 to each 800 Customer's premises equipment 57. The dedicated access facilities may be connected through a central office or routed directly from the Terminating Auction Switch to the 800 Customer's PBX or other premises equipment 57. The 800 Customer will, typically, also have switched access facilities 56 from the local exchange carrier's local central office switch 55 to its premises. As illustrated in FIG. 16, if a "trouble" arises or the dedicated access facility 53 to the 800 Customer's premises is otherwise not available, the Terminating Auction Switch 50 can route toll-free calls to the local exchange carrier's switched network via dedicated or shared facilities 54 for completion to the 800 Customer's premises 57 via the local central office switch 55 over local loop facilities 56. The Terminating Auction Switch 50 can also be equipped to inform the Moderator 1 via data link 58 that a "trouble" or other difficulty has arisen and the Moderator can transmit 43 an alternate NPA-NXX-XXXX destination to the participating Carriers' 800 translation databases 44 (or to the originating switch if this translation is, instead, performed prior to the call being routed to the selected interexchange Carrier).

Figure 15:
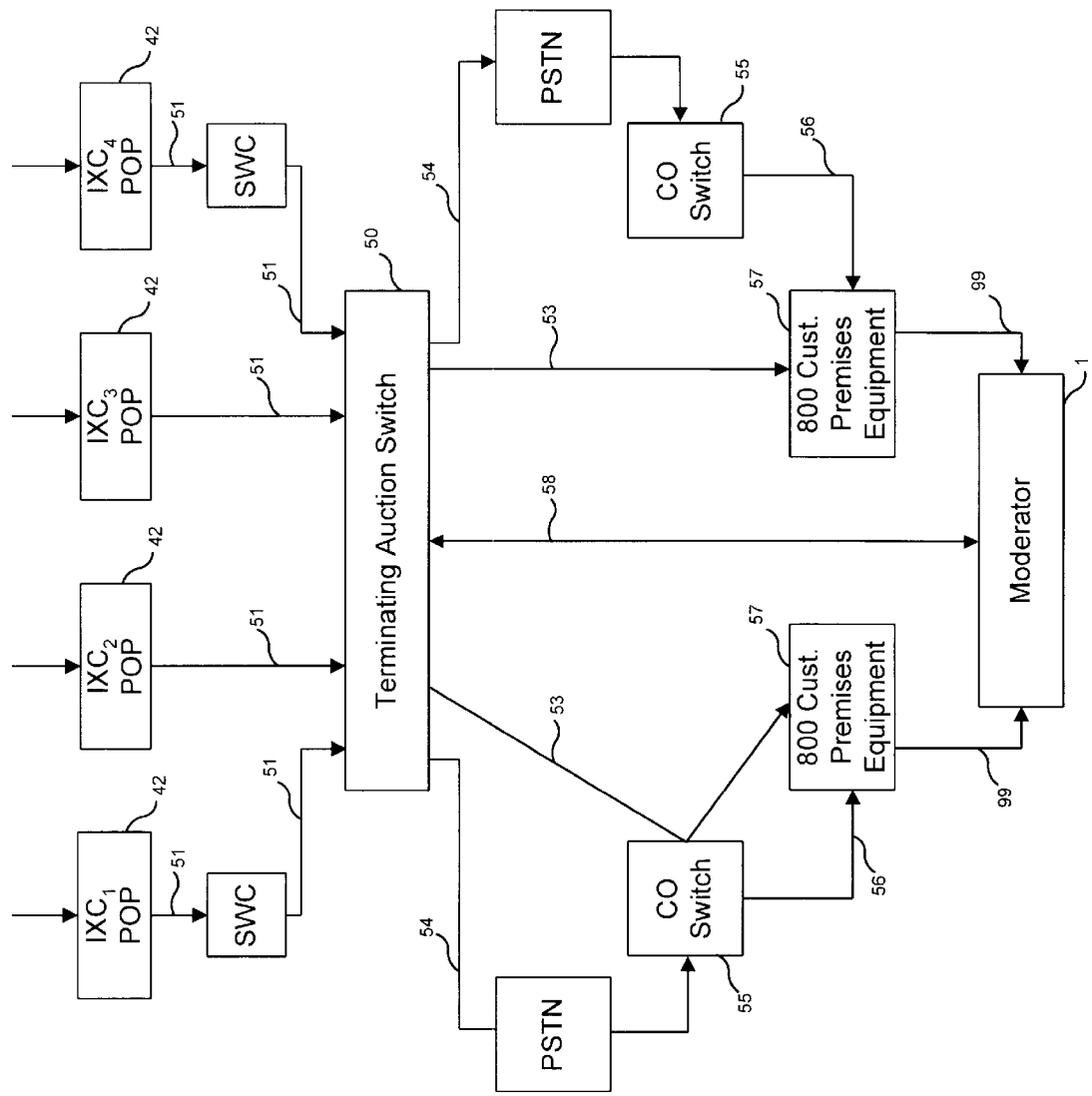
FIG. 15 is a schematic view of an exemplary network architecture showing several IXCs' points-of-presence delivering calls to a terminating auction switch, which then routes such calls to 800 Customers' premises equipment via dedicated facilities or the public switched telecommunications network.
Figure 16:
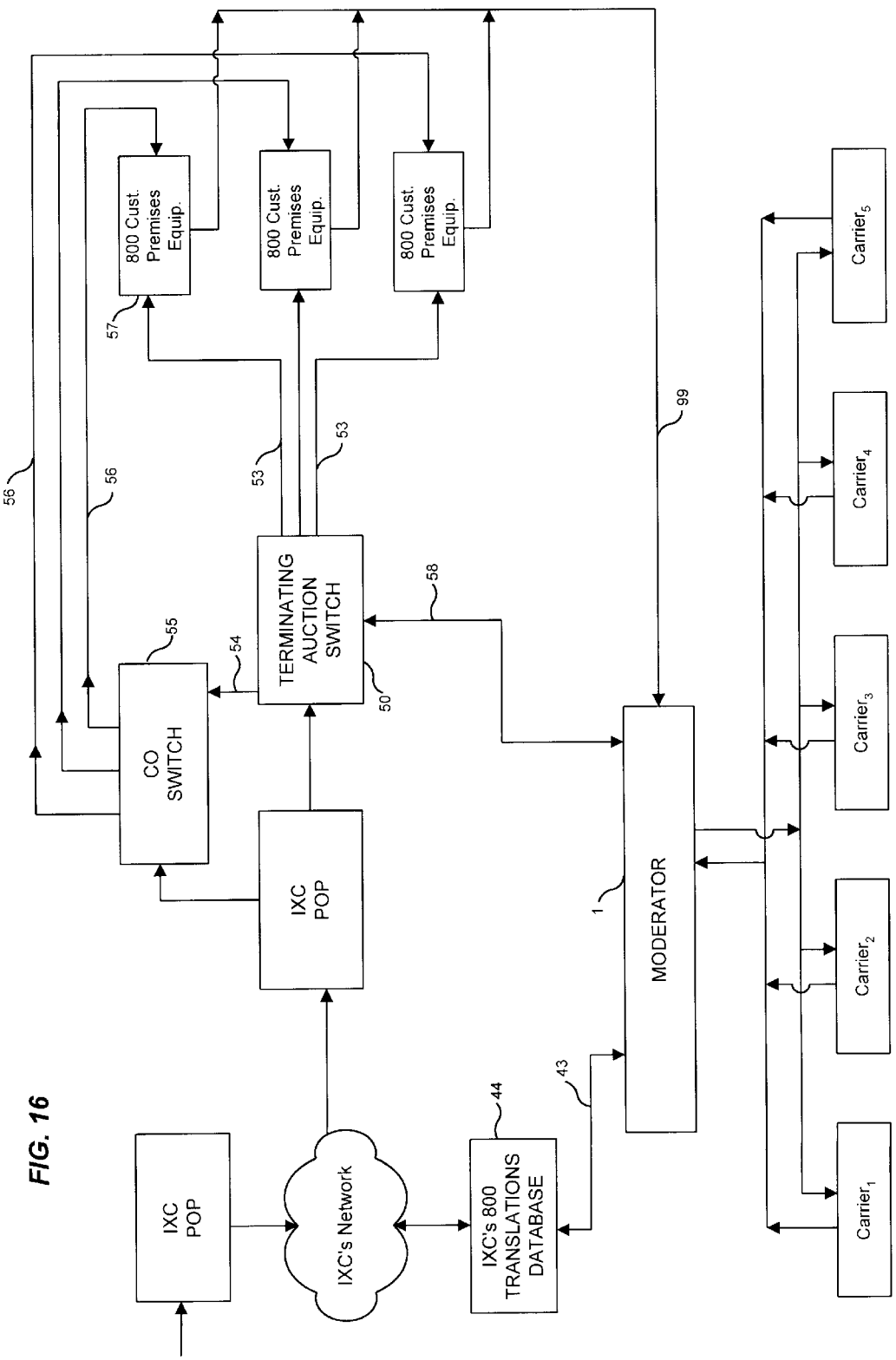
FIG. 16 is a schematic view of an exemplary network architecture showing a data link between the Moderator and a terminating auction switch.
Figure 17:
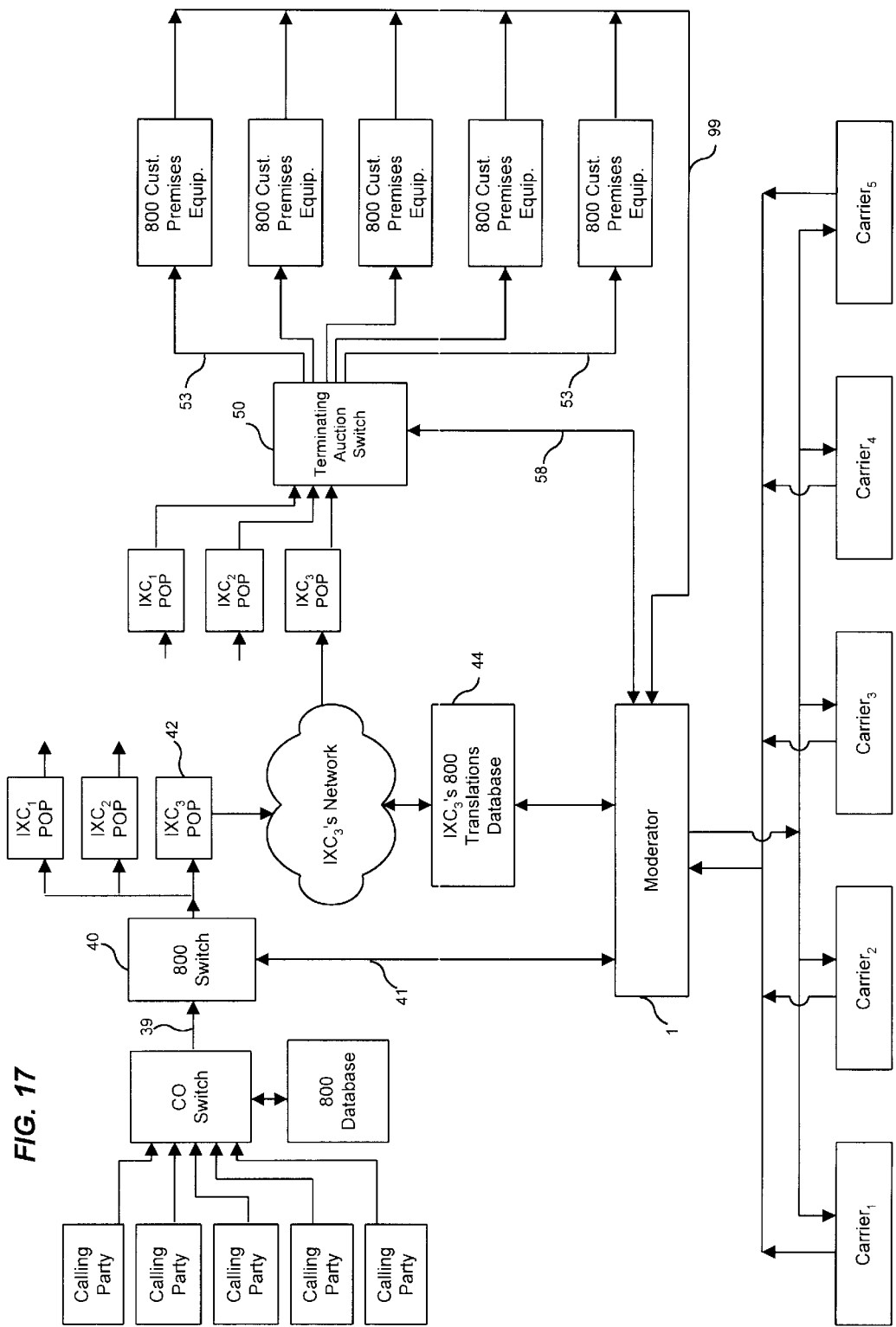
FIG. 17 is a schematic view of an exemplary network architecture in which an 800 Switch receives Carrier selection data from the Moderator and calls are routed by the selected Carrier to a terminating auction switch.
Figure 21:
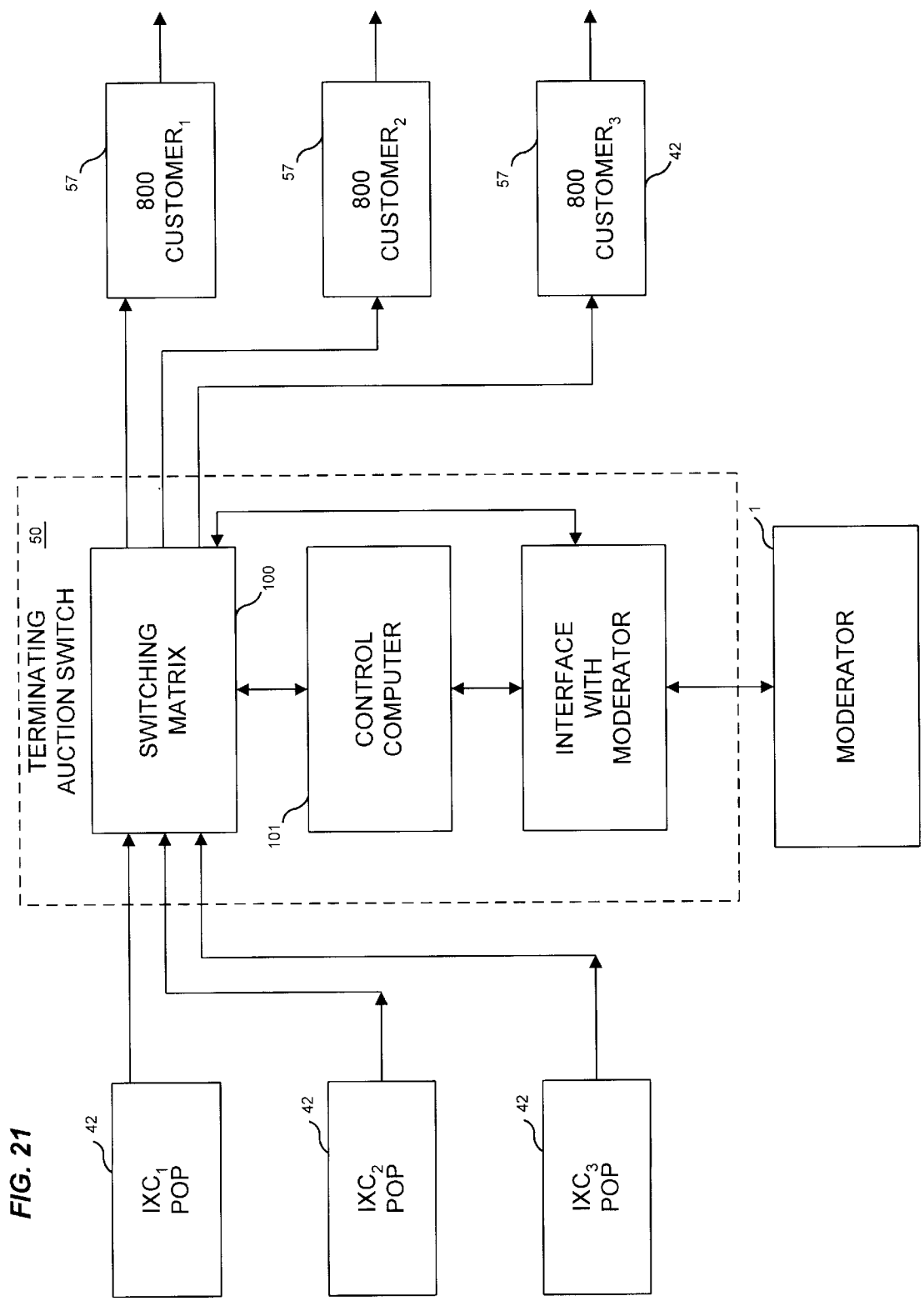
FIG. 21 is a schematic view of an exemplary system of the invention showing a Terminating Auction Switch with a switching matrix, a switch controller (control computer), and an interface with the Moderator.

The Terminating Auction Switch 50 in FIG. 14, and as further illustrated in FIGS. 15 and 21, has a switching matrix 100 for switching calls and a software directed switch controller 101 for receiving calls from several interexchange Carriers 42 and routing such calls to the appropriate 800 Customer 57. The incoming call is switched to the dedicated access facility 53 connected to the 800 Customer's premises equipment 57. Using this architecture, large 800 Customers receiving interexchange traffic over dedicated facilities today can benefit from the auction process and still avoid terminating access charges imposed by local exchange carriers on central office switched access traffic. Even though a dedicated facility may connect through a central office, it is given a dedicated, unswitched connection, not triggering the imposition of a switched access rate element. FIG. 17 illustrates an architecture under which the 800 Customer can avoid access charges at both originating and terminating ends of a toll-free call, using the 800 Switch 40 at the originating end to route the call to the appropriate Carrier and the Terminating Auction Switch 50 at the terminating end to enable delivery via dedicated access facilities 53 to the 800 Customer's premises equipment.

Figure 18:
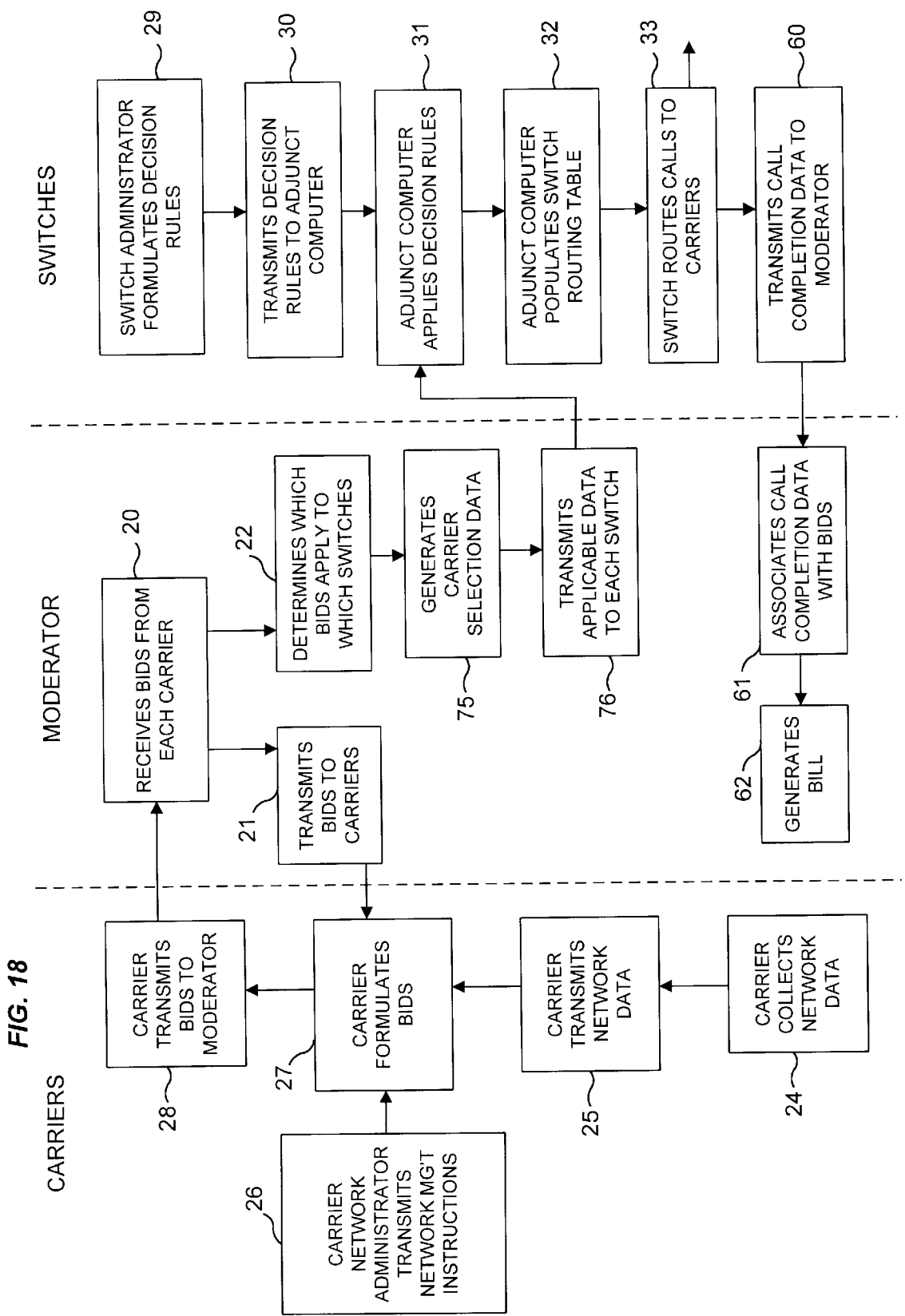
FIG. 18 is a schematic representation of an exemplary process of the invention, including a billing capability after calls are routed by an 800 Switch or a local exchange carrier's central office switch, with the Moderator in both cases having a data link to the subscribing switch via an adjunct computer.

In order to bill each 800 Customer for services provided by each Carrier, the Moderator can associate the call completion data with the bidding data. In order not to require each 800 Customer subscribing to the bidding arrangement to establish a billing relationship with each Carrier taking part in the auction process, a central billing arrangement is advantageous. In the billing arrangement illustrated in FIG. 18, the bidding and routing takes place as illustrated in FIG. 9 or 10. After the subscribing switch (e.g., an 800 Switch or a central office switch querying the Moderator) routes a call 33, it transmits to the Moderator the call completion data 60 identifying the call source, the called party (i.e., the 800/888 number dialed), the Carrier, and any other information necessary for billing purposes (e.g., the time and duration of the call). The Moderator associates 61 the call completion information with the bidding information in its memory to form a billing record of the call, which is stored in a billing data base. Periodically (e.g., at the end of each billing period) the Moderator sorts the billing records by called party identifier and generates a bill 62. This approach results in the preparation of one bill for the 800 Customer covering all of its toll-free calls handled via the auction process during the period specified.

Figure 19:
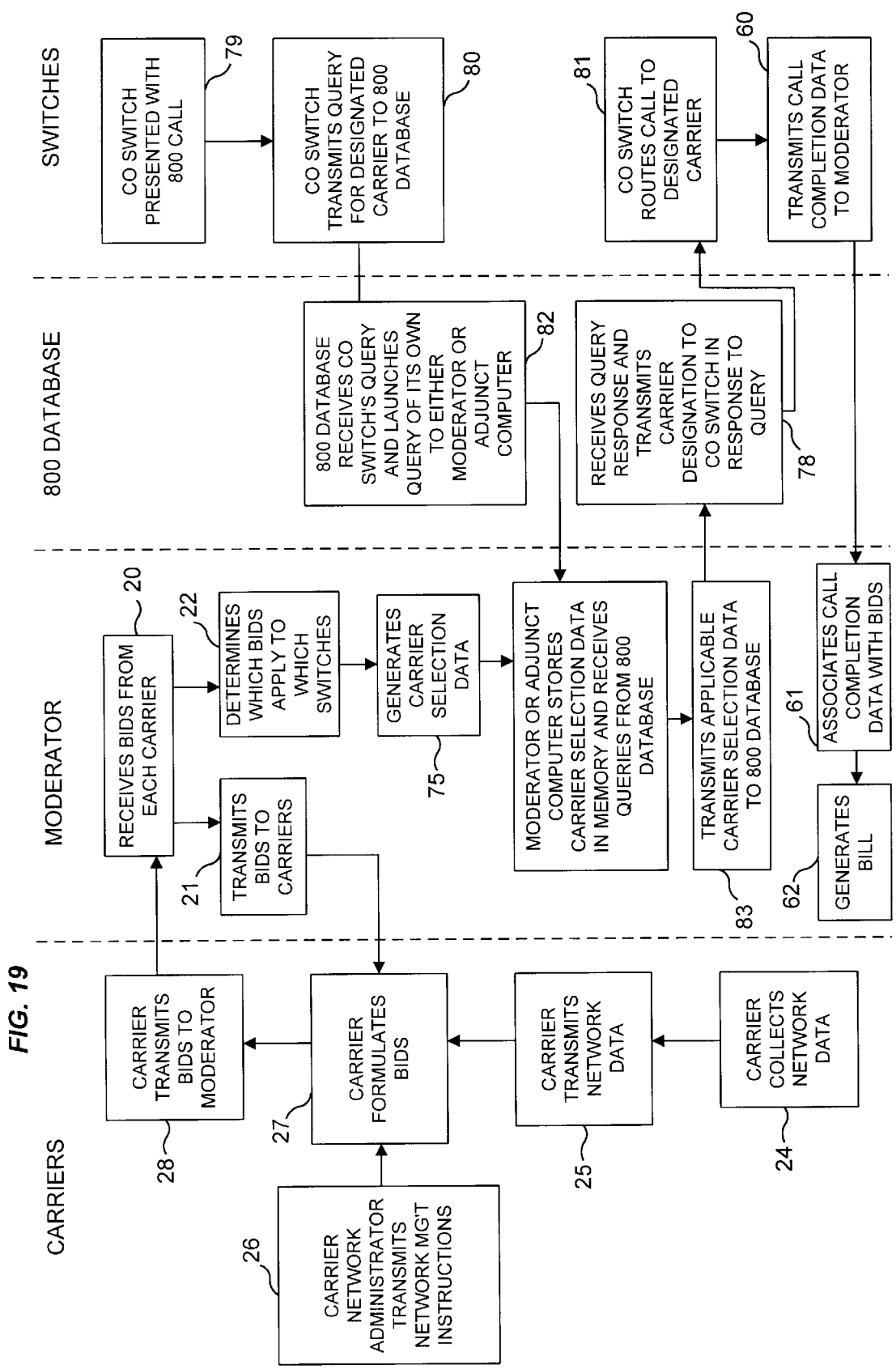
FIG. 19 is a schematic representation of an exemplary process of the invention, including a billing capability after calls are routed by a local exchange carrier's central office switch in accordance with instructions from the 800 Database, with the Moderator having a data link to the 800 Database via an adjunct computer.

FIG. 19 illustrates a billing arrangement in which the bidding and routing of toll-free calls takes place as illustrated in FIG. 7 or 8. After a central office switch routes a call 81, the switch (or a billing computer operated by the local exchange carrier and associated with that switch) transmits to the Moderator the call completion data 60 identifying the call source, the called party (i.e., the toll free-number dialed), the Carrier, and any other information necessary for billing purposes (e.g., the time and duration of the call). The Moderator associates 61 the call completion information with the bidding information in its memory to form a billing record of the call, which is stored in a billing database. Periodically (e.g., at the end of each billing period) the Moderator sorts the billing records by called party identifier and generates a bill 62. This approach results in the preparation of one bill for the 800 Customer covering all of its toll-free calls handled via the auction process during the period specified.

When a toll-free call is placed by a calling party today, a query is launched to the 800 Database by the calling party's local exchange carrier. The local exchange carrier, typically, launches such query from the originating central office switch (or an associated adjunct computer) serving the calling party. If the local exchange carrier elected, it could have these queries to the 800 Database launched instead from any of several possible points in its local exchange network infrastructure (e.g., from the central office switch, the access tandem switch, or any service switching point). For the purposes of this description of the invention and the interpretation of the claims, the term "central office switch" shall mean the point within the local exchange carrier's local network from which a query is launched to the 800 Database each time a toll-free call is placed by a calling party.

What is claimed is:

1. A method for routing a toll-free call presented to a central office switch to a first carrier of a plurality of carriers by means of an auction process in which a moderating computer collects economic incentive data from each carrier of the plurality of carriers designating the economic incentive a carrier will charge to carry a call from an originating point to a terminating point, processes the economic incentive data, and distributes processed data to at least a portion of the plurality of carriers and to an 800 database, thereby enabling the toll-free call to be routed to the first carrier based on an economic choice and then to an 800 customer at the terminating point, the method comprising:
   a. in the moderating computer, processing the economic incentive data to produce carrier selection data relating to designation of the first carrier to carry the toll-free call;
   b. transmitting the carrier selection data to the 800 database and storing the carrier selection data in a memory;
   c. in the central office switch, launching a query to the 800 database requesting an instruction as to which carrier of the plurality of carriers the toll-free call should be routed;
   d. in the 800 database, accessing the memory for the carrier selection data and transmitting the carrier selection data to the switch; and
   e. in the switch, routing the toll-free call to the first carrier for transmission from the originating point to the terminating point.

2. A method of claim 1 in which the carrier selection data includes designation of the first carrier for carriage of the toll-free call from the originating point to the terminating point.

3. A method of claim 1 in which the carrier selection data includes an ordered list of carriers, including the first carrier, for carriage of a call from the originating point to the terminating point.

4. A method of claim 1 in which the carrier selection data is transmitted from the moderating computer to the 800 database at a time determined by the moderating computer.

5. A method of claim 1 including, in the 800 database, launching a query to the moderating computer for carrier selection data for routing the toll-free call from the originating point to the terminating point.

6. A method of claim 1 in which the first carrier launches a query from the first carrier's 800 translation database to the moderating computer for identification of the toll-free call's 800 customer.

7. A method of claim 1 in which the moderating computer transmits data associating toll-free numbers with corresponding 800 customers, to the first carrier's 800 translation database.

8. A method of claim 1 including receiving in the moderating computer, decision rules from the 800 customer for application to the economic incentive data to produce the carrier selection data.

9. A method of claim 1 including receiving in a computer adjunct to a switch, decision rules from the 800 customer for application to the economic incentive data to produce the carrier selection data.

10. A method for routing a toll-free call presented to a first 800 switch of a plurality of 800 switches, to a first carrier of a plurality of carriers by means of an auction process in which a moderating computer collects economic incentive data from each carrier of the plurality of carriers designating the economic incentive a carrier will charge to carry a call from an originating point to a terminating point, processes the economic incentive data, and distributes processed data to at least a portion of the plurality of carriers, thereby enabling the toll-free call to be routed to the first carrier based on an economic choice and then to an 800 customer at the terminating point, the method comprising:
   a. in the moderating computer, processing the economic incentive data to produce carrier selection data relating to designation of the first carrier to carry the 800 call;
   b. transmitting the carrier selection data to at least the first 800 switch of the plurality of 800 switches and storing the carrier selection data in a memory of each receiving 800 switch; and
   c. in the first 800 switch, routing the toll-free call to the first carrier for transmission from the originating point to the terminating point in accordance with the carrier selection data.

11. A method of claim 10 including receiving the carrier selection data at the 800 switch in an adjunct computer and processing the carrier selection data in accordance with decision rules received from an 800 switch administrator.

12. A method of claim 10 in which the carrier selection data is transmitted to the first 800 switch in response to a query from the first 800 switch.

13. A method for routing a toll-free call presented to a central office switch to a first carrier of a plurality of carriers by means of an auction process in which a moderating computer collects economic incentive data from each carrier of the plurality of carriers designating the economic incentive a carrier will charge to carry a call from an originating point to a terminating point, processes the economic incentive data, and distributes processed data to at least a portion of the plurality of carriers, thereby enabling the toll-free call to be routed to the first carrier based on an economic choice and then to an 800 customer at the terminating point, the method comprising:
   a. in the central office switch, upon receipt of an 800 database "no record" response, querying the moderating computer for a designation of the first carrier;
   b. in the moderating computer processing economic incentive data resulting from the auction process to select the first carrier;
   c. transmitting the first carrier designation to the central office switch; and
   d. in the central office switch, routing the toll-free call to the first carrier.

14. A method for routing a toll-free call presented to a central office switch to a first carrier of a plurality of carriers by means of an auction process in which a moderating computer collects economic incentive data from each carrier of the plurality of carriers designating the economic incentive a carrier will charge to carry a call from an originating point to a terminating point, processes the economic incentive data, and distributes processed data to at least a portion of the plurality of carriers, thereby enabling the toll-free call to be routed to the first carrier based on an economic choice and then to an 800 customer at the terminating point, the method comprising:

a. in the central office switch, upon receipt of an 800 database "no record" response, querying a computer adjunct to the central office switch for a designation of the first carrier;

b. in the moderating computer processing economic incentive data resulting from the auction process to select the first carrier;

c. transmitting the first carrier designation to a computer adjunct to the central office switch;

d. in the computer adjunct to the central office switch, transmitting the first carrier designation to the central office switch; and e. in the central office switch, routing the toll-free call to the first carrier.

15. A method for routing a toll-free call presented to a central office switch to a first carrier by means of an auction process controlled by a moderating computer, comprising:

a. in the central office switch, querying an 800 database for a routing instruction;

b. in the central office switch, routing the call to an 800 switch in response to an instruction from the 800 database;

c. in the 800 switch, querying the moderating computer for a further routing instruction, designating a carrier for routing the toll-free call;

d. in the moderating computer, selecting the first carrier in accordance with carrier selection data derived from processing of economic incentive data resulting from the auction process;

e. in the moderating computer, issuing a response designating the first carrier; and f. in the 800 switch, routing the toll-free call to the first carrier.

16. A method for billing an 800 customer for toll-free calls presented to a central office switch and terminating at the 800 customer's premises equipment over the facilities of a first carrier of a plurality of carriers and routed from an originating point to a terminating point in accordance with economic incentive data derived from an auction process controlled by a moderating computer, the method comprising:

a. in a central office at the terminating point, routing the 800 call to the 800 customer and collecting call completion data;

b. transmitting the call completion data to the moderating computer; and c. in the moderating computer, associating the call completion data with the economic incentive data to produce a billing record for the toll-free call.

17. A method of claim 16 including assembling all billing records for toll-free calls placed to the 800 customer and carried by the first carrier during a billing period and generating a first bill for service provided by the first carrier to the 800 customer.

18. A method of claim 17 including assembling the first bill and all other bills for service provided to the 800 customer by all other carriers of the plurality of carriers, to produce a single bill for toll-free service provided by the plurality of carriers to the 800 customer.

19. A method for routing a toll-free call presented to a central office switch, to a first carrier of a plurality of carriers by means of a least cost routing process in which a moderating computer collects economic incentive data from each carrier of a plurality of carriers designating the economic incentive a carrier will charge to carry a call from an originating point to a terminating point, processes the economic incentive data and distributes processed data to an 800 database, thereby enabling the toll-free call to be routed to the first carrier based on an economic choice and then to an 800 customer at the terminating point, the method comprising:

a. in the moderating computer, processing the economic incentive data to produce carrier selection data relating to designation of the first carrier to carry the toll-free call;

b. transmitting the carrier selection data to the 800 database and storing the carrier selection data in a memory;

c. in the central office switch, launching a query to the 800 database requesting an instruction as to which carrier of the plurality of carriers the toll-free call should be routed;

d. in the 800 database, accessing the memory for the carrier selection data and transmitting the carrier selection data to the switch; and e. in the switch, routing the toll-free call to the first carrier for transmission from the originating point to the terminating point.

20. A method for routing a toll-free call presented to a first 800 switch of a plurality of 800 switches, to a first carrier of a plurality of carriers by means of a least cost routing process in which a moderating computer collects economic incentive data from each carrier of the plurality of carriers designating the economic incentive a carrier will charge to carry a call from an originating point to a terminating point, and processes the economic incentive data, thereby enabling the toll-free call to be routed to the first carrier based on an economic choice and then to an 800 customer at the terminating point, the method comprising:

a. in the moderating computer, processing the economic incentive data to produce carrier selection data relating to designation of the first carrier to carry the toll-free call;

b. transmitting the carrier selection data to at least the first 800 switch of the plurality of 800 switches and storing the carrier selection data in a memory of each receiving 800 switch; and c. in the first 800 switch, routing the toll-free call to the first carrier for transmission from the originating point to the terminating point in accordance with the carrier selection data.

21. A method for routing a toll-free call presented to a central office switch to a first carrier of a plurality of carriers by means of a least cost routing process in which a moderating computer collects economic incentive data from each carrier of the plurality of carriers designating the economic incentive a carrier will charge to carry a call from an originating point to a terminating point, and processes the economic incentive data, thereby enabling the toll-free call to be routed to the first carrier based on an economic choice and then to an 800 customer at the terminating point, the method comprising:

a. in the central office switch, upon receipt of an 800 database "no record" response, querying the moderating computer for a designation of the first carrier;

b. in the moderating computer processing economic incentive data resulting from the auction process to select the first carrier;

c. transmitting the first carrier designation to the central office switch; and d. in the central office switch, routing the toll-free call to the first carrier.

22. A method for routing a toll-free call presented to a central office switch to a first carrier of a plurality of carriers by means of a least cost routing process in which a moderating computer collects economic incentive data from each carrier of the plurality of carriers designating the economic incentive a carrier will charge to carry a call from an originating point to a terminating point, and processes the economic incentive data thereby enabling the toll-free call to be routed to the first carrier based on an economic choice and then to an 800 customer at the terminating point, the method comprising:

a. in the central office switch, upon receipt of an 800 database "no record" response, querying a computer adjunct to the central office switch for a designation of the first carrier;

b. in the moderating computer processing economic incentive data resulting from the auction process to select the first carrier;

c. transmitting the first carrier designation to a computer adjunct to the central office switch;

d. in the computer adjunct to the central office switch, transmitting the first carrier designation to the central office switch; and e. in the central office switch, routing the toll-free call to the first carrier.

* * * * *